(12) United States Patent
Triandopoulos et al.

(10) Patent No.: US 9,496,897 B1
(45) Date of Patent: Nov. 15, 2016

(54) METHODS AND APPARATUS FOR GENERATING AUTHENTICATED ERROR CORRECTING CODES

(71) Applicant: EMC Corporation, Hopkinton, MA (US)

(72) Inventors: Nikolaos Triandopoulos, Arlington, MA (US); Ari Juels, Brookline, MA (US); Roberto Tamassia, Providence, RI (US); James Alan Kelley, Waltham, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 91 days.

(21) Appl. No.: 14/230,655

(22) Filed: Mar. 31, 2014

(51) Int. Cl.
*H04L 9/00* (2006.01)
*H03M 13/37* (2006.01)
*H03M 13/00* (2006.01)
*H04L 29/06* (2006.01)

(52) U.S. Cl.
CPC .............. *H03M 13/63* (2013.01); *H04L 9/002* (2013.01); *H04L 63/0435* (2013.01); *H03M 13/3761* (2013.01); *H04L 63/04* (2013.01); *H04L 63/0428* (2013.01)

(58) Field of Classification Search
CPC ............... H03M 13/3761; H03M 13/63; H04L 63/04; H04L 63/0428; H04L 63/0435
USPC ......................................................... 714/752
See application file for complete search history.

(56) References Cited

U.S. PATENT DOCUMENTS

| 8,381,062 | B1* | 2/2013 | Juels | H04L 9/3221 714/752 |
| 2010/0100791 | A1* | 4/2010 | Abu-Surra | H03M 13/118 714/752 |
| 2011/0299629 | A1* | 12/2011 | Luby | H03M 13/3761 375/299 |
| 2011/0314346 | A1* | 12/2011 | Vas | H04L 63/06 714/49 |

(Continued)

OTHER PUBLICATIONS

Yanling Xing, Yukui Pei, and Ning Ge, "LT Code Design Based on RC4 Sequential Cipher", 2012, IEEE.*

(Continued)

*Primary Examiner* — Albert Decady
*Assistant Examiner* — Christian Dorman
(74) *Attorney, Agent, or Firm* — Ryan, Mason & Lewis, LLP

(57) ABSTRACT

Methods and apparatus are provided for encoding and decoding via authenticated error correcting codes, such as secure LT codes, secure Raptor codes, block codes and/or rateless codes. Encoded symbols are generated via an authenticated error correcting code by applying a Luby Transform (LT) code to a plurality of message symbols to produce one or more intermediate symbols using a pseudo random number generator (PRNG) to select the plurality of message symbols to combine to produce the intermediate symbols; encrypting the intermediate symbols to produce encrypted symbols; computing an authentication value, such as a message authentication code (MAC), over one or more of the one or more encrypted symbols; and appending the authentication value to the corresponding encrypted symbols to form the encoded symbols. Block scalable and random scalable constructions are also provided, as well as decoding techniques for all of the constructions.

27 Claims, 14 Drawing Sheets

(56) References Cited

U.S. PATENT DOCUMENTS

| | | | |
|---|---|---|---|
| 2012/0210190 A1* | 8/2012 | Luby | H03M 13/3761 |
| | | | 714/755 |
| 2013/0254631 A1* | 9/2013 | Luby | H03M 13/356 |
| | | | 714/776 |
| 2014/0068704 A1* | 3/2014 | Grewal | H04L 63/0428 |
| | | | 726/1 |
| 2014/0212142 A1* | 7/2014 | Doniec | H04B 13/02 |
| | | | 398/104 |

OTHER PUBLICATIONS

Lopes et al., "Stopping a Rapid Tornado with a Puff", IEEE Symposium on Security and Privacy (SP) 2014, 509-523 (May 2014).

* cited by examiner

CorruptExp$_{A,C,S}(\pi)$:
1. Let $\psi \leftarrow \perp$ be the initial state a $A$.
2. Let $count = 1$
3. Let $m_R \leftarrow \perp$ be used to store the output of Decode.
4. Let $s \leftarrow$ Gen($1^\lambda$) be the secret key.
5. while $A$ has another query do      ▷ This is the learning phase. $A$ makes at most $q$ queries.
   (a) $A(\pi, \psi, m_R) \rightarrow (\psi', m)$
   (b) Instantiate the encoding oracle $O_m$ to provide access to the output of Encode($s, \pi, count, m$)
   (c) $A(\pi, \psi', m)^{O_m(.)} \rightarrow (\psi'', \sigma_1,...,\sigma_N)$   ▷ $A$ gets code symbols from $O_m$ and outputs a corrupted encoding.
   (d) Decode($\pi, s, \sigma_1,...,\sigma_N) \rightarrow m'$
   (e) Set $m_R \rightarrow m', \psi \leftarrow \psi''$, increment $count$, and continue
6. end for
7. $A(\pi, \psi, m_R) \rightarrow (\psi', m_{attack})$   ▷ This is the attack phase. $A$ tries to cause decoding failure or a decoding error.
8. Let $O_m =$ Encode($s, \pi, count, m_{attack}$)
9. $A(\pi, \psi', m_{attack})^{O_m(.)} \rightarrow (\psi'', \sigma_1,...,\sigma_N)$
10. Decode($\pi, s, \sigma_1,...,\sigma_N) \rightarrow m'$
11. If $m' == \perp$ or $m' \neq m_{attack}$ then output 1.
12. Else output 0.

200

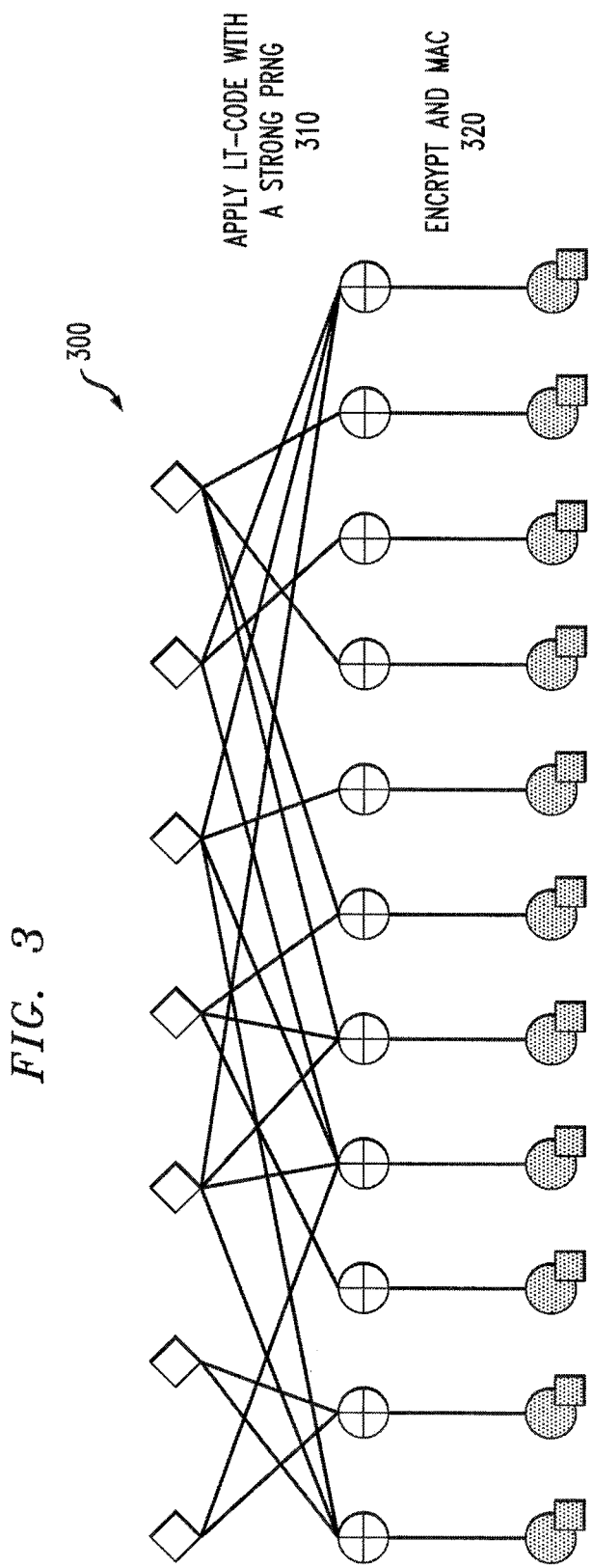

FIG. 4

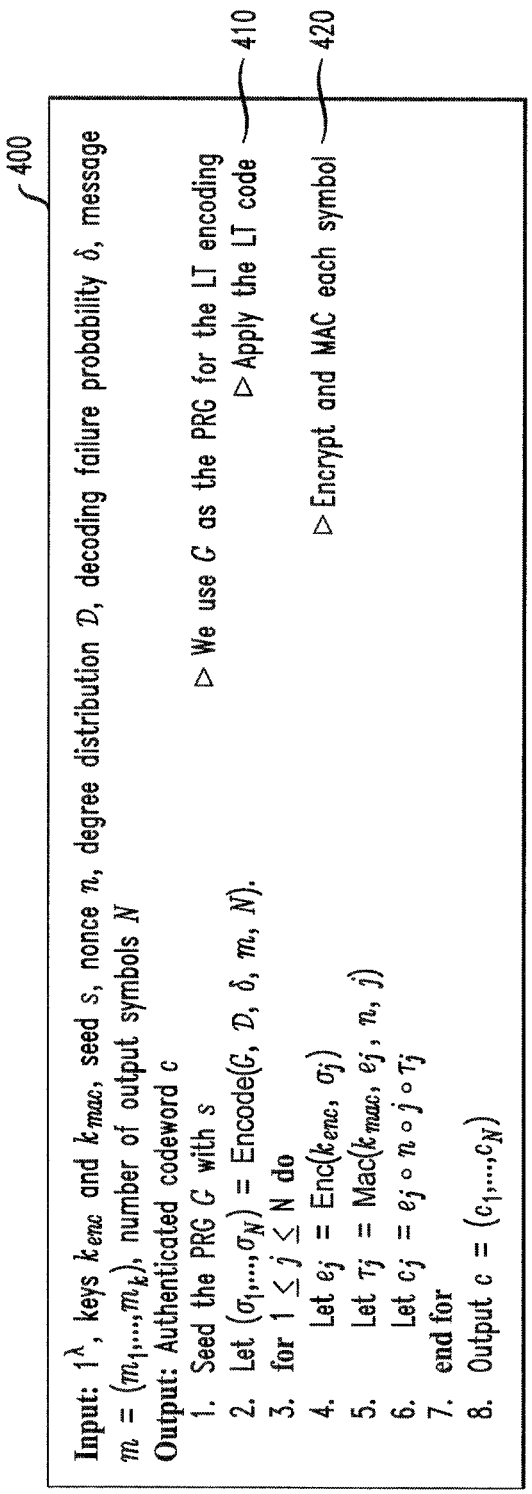

Input: $1^\lambda$, keys $k_{enc}$ and $k_{mac}$, seed $s$, nonce $n$, degree distribution $\mathcal{D}$, decoding failure probability $\delta$, message $m = (m_1,...,m_k)$, number of output symbols $N$
Output: Authenticated codeword $c$
1. Seed the PRG $G$ with $s$          ▷ We use $G$ as the PRG for the LT encoding
2. Let $(\sigma_1,...,\sigma_N)$ = Encode($G$, $\mathcal{D}$, $\delta$, $m$, $N$).          ▷ Apply the LT code — 410
3. for $1 \leq j \leq N$ do
4.    Let $e_j$ = Enc($k_{enc}$, $\sigma_j$)          ▷ Encrypt and MAC each symbol — 420
5.    Let $\tau_j$ = Mac($k_{mac}$, $e_j$, $n$, $j$)
6.    Let $c_j = e_j \circ n \circ j \circ \tau_j$
7. end for
8. Output $c = (c_1,...,c_N)$

FIG. 5

```
Input: Security parameter 1^λ, keys k_enc and k_mac, seed s, nonce n, message size k, degree distribution D,
       decoding failure probability δ, authenticated codeword c
Output: Message m = (m_1,...,m_k)
 1.  Let Rem = ∅ (i.e., the empty set)
 2.  Break c into N authenticated symbols c_1,...,c_N
 3.  for 1 ≤ j ≤ N do
 4.      Parse c_j = e_j ∘ n' ∘ j ∘ τ_j
 5.      if n' ≠ n or VerifyMac(k_mac, e_j, n, j, τ_j) == 0 then         ▷ Sieve out corrupted blocks of symbols.
 6.          Discard c_j
 7.      else
 8.          Let σ_j = Dec(k_enc, e_j )
 9.          Rem = Rem ∪ {(σ_j, j)}
10.      end if
11.  end for
12.  Seed the strong PRG G
13.  Let m = Decode(G, k, D, δ, Rem)
14.  Output m
```
— 500

FIG. 8

Input: message $m$, symbols per block $k$, degree distribution $\mathcal{D}$, probability of decoding failure $\delta$, keys $k_{enc}$ and $k_{mac}$, seed $s$, corruption rate $\gamma$, block-corruption tolerance $\tau$, (strong) PRG $G$, (weak) PRG $H$
Output: authenticated codeword $c$ 1. Let $b = |m|/k$ and $\varepsilon = f(\mathcal{D}, \delta)$       ▷ $|m|$ denotes the number of symbols in $m$ and $\varepsilon$ is the overhead
2. Seed $G$ with $s$
3. Let $M = \overline{1-(1+\tau)\gamma}(1+\varepsilon)k$
4. Generate permutation $\pi$ of $b * M$ elements       ▷ $G$ is a strong (but slow) PRG
5. Partition $m$ into blocks $B_1,...,B_b$
6. for $1 \leq i \leq b$ do
7.     Generate a seed $s'_i$ $G$
8.     Seed a weak (but fast) PRG $H$ as the source of randomness for Encode
9.     Let $(\sigma_{i,1},...,\sigma_{i,M}) = \text{Encode}(H, k, \mathcal{D}, \delta, M, B_i)$       ▷ Compute $M$ parity symbols
10.    for $1 \leq j \leq M$ do
11.        Let $e_{i,j} = \text{Enc}(k_{enc}, \sigma_{i,j})$ and $\tau_{i,j} = \text{Mac}(k_{mac}, e_{i,j})$
12.        Let $c_{i,j} = e_{i,j} \circ \tau_{i,j}$
13.    end for
14. end for
15. Apply $\pi$ to all $c_{i,j}$ to get $c' = (c'_1,...,c'_{bM})$       ▷ $c_{i,j}$ is mapped to position $\pi(i * M + j)$
16. Output $c' = (c'_1,...,c'_{bM})$

800

Input: authenticated codeword $c$, symbols per block $k$, degree distribution $\mathcal{D}$, probability of decoding failure $\delta$, keys $k_{enc}$ and $k_{mac}$, seed $s$, corruption rate $\tau$, block-corruption tolerance $\gamma$, (strong) PRG $G$, (weak) PRG $H$
Output: message $m$ 1. Let $\varepsilon = f(\mathcal{D}, \delta)$
2. Let $M = \frac{1}{1-(1+\tau)\gamma}(1+\varepsilon)k$            $\triangleright$ $\varepsilon$ is the overhead
3. Seed the PRG $G$ using $s$
4. Construct a permutation $\pi$ over $bM$ elements
5. Compute $\pi^{-1}$ and permute the $c_i$'s with $\pi^{-1}$
6. for $1 \leq i \leq bM$ do
7.      Parse $c_i = (e_i, \tau_i)$
8.      if VerifyMac($k_{mac}, e_i, \tau_i$) == 0 then
9.          Discard $c_i$ and continue
10.      else
11.          Let $\sigma_i = \text{Dec}(k_{enc}, e_i)$
12.      end if
13. end for
14. Break $\sigma_i$'s into blocks $B_1, \ldots, B_b$ of $M$ symbols, marking missing symbols as erased
15. for $1 \leq i \leq b$ do
16.      Generate a seed $s'$ using $G$
17.      Seed a weak (but fast) PRG $H$ as the source of randomness for Decode
18.      Let $m_i = (m_{i,1}, \ldots, m_{i,k}) = \text{Decode}(H, k, \mathcal{D}, \delta, B_i)$
19.      if $m_i = \bot$ then
20.          Output $\bot$ and exit
21.      if
22. end for
23. Output $m = (m_{1,1}, \ldots, m_{b,k})$

```
Input: message m, symbols per block k, degree distribution D, probability of decoding failure δ, keys k_enc and
k_mac, seed s, (strong) PRG G, (weak) PRG H
Output: authenticated codeword c 1.  Let b = |m|/k                                      ▷ |m| denotes the number of symbols in m
2.  Seed G with s                                      ▷ G is a strong (but slow) PRNG
3.  Initialize b instances of H with a random seed each
4.  Initialize b encoders Encode_1,...,Encode_b, where Encode_i uses the i-th instance of H
5.  Divide m into b blocks m_1,...,m_b
6.  for as long as we desire do
7.      Sample a block index i from G
8.      Let σ be the next symbol of Encode_i
9.      Let e = Enc(k_enc, σ)
10.     Let τ = Mac(k_mac, e)
11.     Output e ∘ τ
12. end for
```
— 1100

*FIG. 12*

```
Input: authenticated codeword c, symbols per block k, degree distribution D, probability of decoding failure δ,
       keys k_enc and k_mac, seed s, (strong) PRG G, (weak) PRG H
Output: message m 1.  Seed the PRNG G using s
2.  Initialize b instances of H with a random seed each
3.  Initialize b decoders Decode_1,...,Decode_b, where Decode_i uses the i-th instance of H
4.  for each symbol c_i in c do
5.      Parse c_i = (e_i, τ_i)
6.      if VerifyMac(k_mac, e_i, τ_i) == 0 then
7.          Discard c_i and continue
8.      end if
9.      Let σ_i = Dec(k_enc, e_i)
10.     Take i-th sample from G to get block index j
11.     Update Decode_j with σ_i
12. end for
13. for 1 ≤ i ≤ b do
14.     Let (m_{i,1},...,m_{i,k}) be the message symbols output by Decode_i
15.     If (m_{i,1},...,m_{i,k}) = (⊥,...,⊥), then output ⊥ and exit    ▷ If any block fails to decode, output nothing
16. 
17. end for
18. Output m = (m_{1,1},...,m_{b,k})
```

METHODS AND APPARATUS FOR GENERATING AUTHENTICATED ERROR CORRECTING CODES

FIELD OF THE INVENTION

The present invention relates generally to error correcting codes, such as Luby Transform (LT) codes and Raptor codes, and more particularly, to techniques for securely encoding and decoding using such error correcting codes over an adversarial channel.

BACKGROUND OF THE INVENTION

Error correcting codes have many uses and applications including increasing reliability of data storage and transmitting data over an unreliable channel. Many applications utilize codes such as Reed-Solomon codes for error correction with strong error correcting capacity (i.e., information-theoretic rather than probabilistic) as well as the simplicity of the algorithms and implementation. However, Reed-Solomon codes often require quadratic time in the input size to encode the input message. Indeed, although using fast Discrete Fourier Transform algorithms, k input symbols can be encoded to n output symbols in $O(n(\log n)^2 \log \log n)$ operations in the finite field $F_q$—where this complexity can be reduced to $O(n \log^2 n)$, for fields of characteristic 2, or even to $O(n \log n)$, when q is a specific type of prime—these algorithms are not practical for small n. In practice, using Horner's method to directly evaluate the underlying polynomial requires $O(kn)$ field operations which is much more efficient for small n.

Several codes have been proposed to overcome this quadratic encoding overhead. For example, Tornado codes are erasure codes achieve an asymptotic performance of $O(n \log n)$ (where n is the number of input symbols) and encoding and decoding speeds 100 to 10000 times greater than Reed-Solomon codes. In addition, Luby Transform (LT)-codes are erasure codes that use a carefully crafted sparse bipartite graph to also achieve $O(n \log n)$ encoding and decoding overhead. Furthermore, Raptor codes (rapid tornado codes) are erasure codes that perform encoding and decoding in linear time (in n) and are currently the fastest performing codes. Online codes are erasure codes that also have linear time encoding and decoding. Unlike Reed-Solomon and Tornado codes, which are block or fixed-rate codes producing a fixed number of output code symbols, it is noted that LT, Raptor and Online codes are also fountain codes that can generate a practically unlimited number of output code symbols.

However, each of these efficient bipartite-graph based fountain codes—hereby, simply called fountain codes—is an erasure code, thus not an error-corrective code, and has been analyzed over a random (erasure) channel rather than an adversarial (corruption) channel. Indeed, an adversarial channel could prevent the receiver from ever decoding the message by selectively corrupting symbols (e.g., by corrupting any code symbol that has the first message symbol in it). This attack fundamentally undermines one of the benefits of fountain codes; namely, that if the receiver simply waits for more code symbols (and the sender keeps generating such symbols), the receiver can eventually decode the file.

A need remains for authenticated error correcting codes that are substantially secure against a computationally bounded, adversarial channel. A further need remains for authenticated error correcting codes that substantially prevent the above-described selective-corruption attack.

SUMMARY OF THE INVENTION

The present invention in the illustrative embodiments described herein provides techniques for encoding and decoding via authenticated error correcting codes, such as secure LT codes, secure Raptor codes, block codes and/or rateless codes. According to one encoding aspect of the invention, one or more encoded symbols are generated via an authenticated error correcting code by applying a Luby Transform (LT) code to a plurality of message symbols to produce one or more intermediate symbols using a pseudo random number generator (PRNG) to select the plurality of message symbols to combine to produce the one or more intermediate symbols; encrypting the one or more intermediate symbols to produce one or more encrypted symbols; computing an authentication value, such as a message authentication code (MAC), over one or more of the one or more encrypted symbols; and appending the authentication value to the corresponding encrypted symbols to form the one or more encoded symbols.

According to a block scalable aspect of the invention, the plurality of message symbols are divided into a plurality of blocks, the LT code is applied to each block independently to obtain a corresponding set of one or more intermediate symbols for each of the blocks, the encrypting and computing steps are applied to the corresponding set of one or more intermediate symbols for each of the blocks to collectively form the one or more encoded symbols and the one or more encoded symbols from the plurality of blocks are permuted to form one or more permuted encoded symbols. An implicit permutation is also disclosed.

According to a random scalable aspect of the invention, the plurality of message symbols are also divided into a plurality of blocks, an LT encoder is associated with each of the blocks, an LT encoder is randomly selected to generate each successive symbol of the one or more encoded symbols, and wherein each of the LT encoders performs the steps of (i) independently applying the LT code to produce the one or more intermediate symbols; (ii) encrypting the at least one intermediate symbol to produce the one or more encrypted symbols; (iii) computing the authentication value over the one or more of the encrypted symbols; and (iv) appending the authentication value to the corresponding encrypted symbols to form the successive symbol of the one or more encoded symbols.

According to a decoding aspect of the invention, a plurality of received encoded symbols generated via an authenticated error correcting code are processed by evaluating the integrity of one or more symbols from the plurality of received encoded symbols by verifying an authentication value appended to the one or more symbols from the plurality of received encoded symbols; if the integrity evaluation succeeds, decrypting the one or more symbols from the plurality of received encoded symbols to produce one or more authenticated decrypted received symbols; and decoding the one or more authenticated decrypted received symbols using a Luby Transform (LT) decoder that employs a pseudo random number generator (PRNG) to select the one or more authenticated decrypted received symbols that are combined to produce one or more decoded symbols. Block scalable and random scalable decoding techniques are also provided.

The code generation and decoding techniques of the illustrative embodiments overcome one or more of the problems associated with the conventional techniques described previously, and permit security against a computationally bounded, adversarial channel. These and other features and advantages of the present invention will become more readily apparent from the accompanying drawings and the following detailed description.

BRIEF DESCRIPTION OF THE DRAWINGS

FIG. 2 illustrates an exemplary security game for a secure private fountain coding scheme;
FIG. 3 illustrates an exemplary encoding via authenticated error correcting LT codes in accordance with aspects of the present invention;
FIG. 4 illustrates exemplary pseudo code for a first embodiment for encoding authenticated error correcting LT codes;
FIG. 5 illustrates exemplary pseudo code for a first embodiment for decoding authenticated error correcting LT codes;
FIG. 8 illustrates exemplary pseudo code for an encoding algorithm for a block scalable authenticated error correcting LT code using an explicit permutation on the parity symbols;
FIG. 9 illustrates exemplary pseudo code for a decoding algorithm for a block scalable authenticated error correcting LT code using an explicit permutation on the parity symbols;
FIG. 11 illustrates exemplary pseudo code for an encoding algorithm for a random scalable authenticated error correcting LT code;
FIG. 12 illustrates exemplary pseudo code for a decoding algorithm for a random scalable authenticated error correcting LT code.

DETAILED DESCRIPTION

Figure 1A:
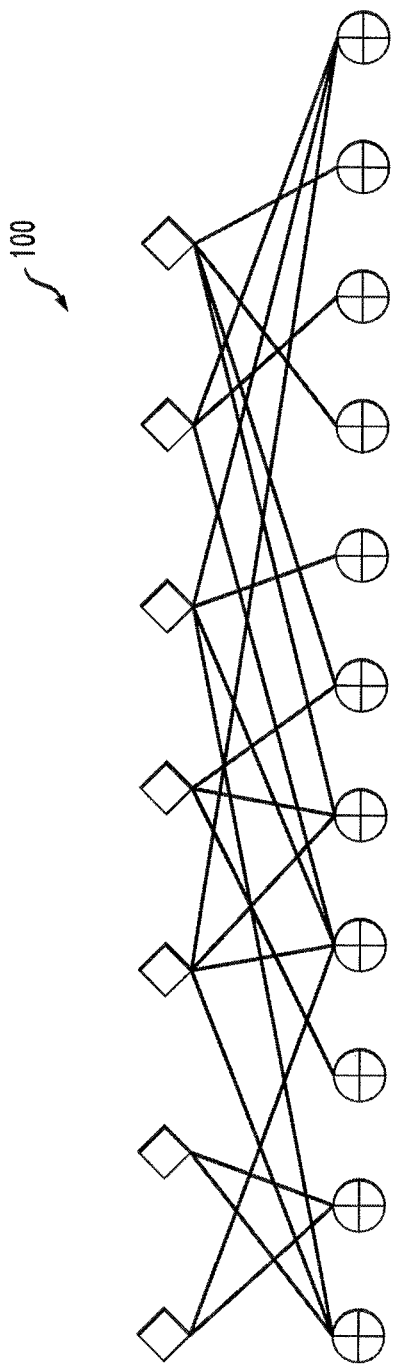
FIG. 1A illustrates an exemplary LT code.

Aspects of the present invention provide techniques for encoding and decoding via authenticated error correcting codes, such as secure LT codes and secure Raptor codes. Various aspects of the present invention provide three exemplary constructions for authenticated error correcting codes, based on LT codes. In addition, each of the three exemplary constructions for error correcting LT codes can be further extended, as described herein, to provide authenticated error correcting Raptor codes. In various embodiments, the exemplary authenticated error correcting codes (1) can correct arbitrary errors in an encoded message with high probability, and (2) require only linear or quasi-linear encoding and decoding time.

An adversarial model is presented for fountain, i.e., rateless, codes over a computationally bounded channel and a corresponding definition of security. In this exemplary adversarial model, constructions are provided for authenticated error correcting codes that are substantially resilient to adversarial corruptions using cryptographic primitives while substantially maintaining linear or quasi-linear time encoding and decoding. The exemplary embodiments are substantially secure against computationally-bounded, adversarial channels in the standard model.

As previously noted, encoding with a Reed-Solomon code is O(nk), at best, using Horner's method to evaluate a degree k−1 polynomial at n points. This assumes that field operations are constant time. The quadratic cost for encoding and decoding becomes readily apparent for larger files and can become a bottle neck on the performance of the system. Thus, it is desirable to seek a (quasi-)linear time encoding and decoding algorithm that can provide the same error correction guarantees. As previously indicated, LT codes provide quasi-linear (in k) and Raptor codes provide linear (in k) time for encoding and decoding while ensuring decodability with high probability. Unfortunately, LT codes provide message-recovery guarantees over random channels rather than adversarial channels. In particular, LT codes provide protections primarily with respect to random symbol erasures, and some limited protections against message corruption, assuming that the errors are introduced into the encoded data according to some fixed probability distribution, e.g., using a Gaussian white noise channel. LT codes allow for the possibility of decoding to fail, but this probability is bounded and even user configurable. However, in the presence of an adversarial channel, the probability of decoding failure can be increased well beyond the user-determined bound and any secure solution must take this into account.

Aspects of the invention provide three exemplary constructions of authenticated error correcting LT codes that provide similar efficiency guarantees as normal LT codes, but while protecting against corruption and ensuring that the decoding failure probability does not significantly increase. These benefits are for a computationally bounded channel, rather than the traditional (implicitly) computationally unbounded channel. This allows cryptographic primitives to be leveraged to achieve better error correction. The disclosed exemplary candidate constructions achieve strong error correcting capabilities. A combination of a strong pseudo-random number generator, a semantically secure cipher, and an unforgeable message authentication code (MAC) are leveraged in the exemplary embodiments to secure the code.

The disclosed exemplary authenticated error correcting LT codes comprise a logarithmic-time (per received code symbol) error correcting code that can withstand adversarial corruption of the code symbols. A further aspect of the invention provides a new adversarial model for analyzing the security of fountain codes (of which, LT codes are an example). A comparison of aspects of the current invention is presented in Table 1.

TABLE 1

Comparison of three exemplary constructions.
Comparison of Exemplary Constructions

| Construction | Rateless | Efficiency | Strong PRNG | Weak PRNG |
|---|---|---|---|---|
| Basic | yes | O(k log k) | yes | no |
| Block Scalable | no | O(bk(log k + log b)) | yes | yes |
| Random Scalable | yes | O(bk log k) O(b log b + bk loglog b) | yes | no |

The number of input symbols is k and the number of blocks is b. For the latter two schemes, k indicates the number of symbols per block. The second column indicates whether or not the given construction is rateless. The third column gives the asymptotic efficiency of encoding and decoding. The Random Scalable construction has two different asymptotic behaviors depending on the parameterization. The last two columns indicate what type of PRNG is used as part of the construction.

As would be apparent to those skilled in art based on the present disclosure, any of the disclosed exemplary authenticated error correcting LT codes can be employed in the design of a corresponding authenticated error correcting Raptor code, as discussed further below.

Preliminaries

Notation

The security parameter is denoted by $\lambda$ and the empty string is denoted by $\Lambda$ (normally the latter is $\in$, but that symbol is used extensively as an upper-bound on probabilities). If Alg is a probabilistic algorithm, let $[\text{Alg}(\pi)]$ denote the set of all possible outputs of Alg when run on parameters $\pi$. Let $$x \xleftarrow{R} S$$

denote sampling x from the set S uniformly at random. Let $x \leftarrow D$ denote sampling x according to distribution D. There is some notational overloading as $\leftarrow$ is used for assignment in algorithm listings, but it will be clear from the context whether it is being used as assignment or sampling. String concatenation is denoted with the symbol "$\circ$". "Probabilistic polynomial time" is abbreviated with PPT.

Coding Theory

An error correcting code (ECC) is a message encoding scheme that can tolerate some corruption of data and still decode the (corrupted) codeword to the original message. Codes that are designed to recover from partial data loss, but not data corruption, are called erasure codes.

The set $\Sigma$ is called the alphabet of the code and individual elements of $\sigma \in \Sigma$ are called code symbols. For instance, $\Sigma = \{0,1\}^l$, is the set of all l-bit strings or a finite field F. Elements of $\Sigma^k$ are called messages and the elements of $\Sigma^n$ are called codewords. The Hamming distance between two codewords x and y is defined as $\Delta(x,y) = |\{i | 1 \le i \le n, x_i \ne y_i\}|$. A code C has minimum distance d if for all $x,y \in \Sigma^n$ such that $x \ne y$, then $\Delta(x,y) \ge d$. Roughly, this is the minimum number of changes needed to transform one valid codeword into another valid codeword. If the first k symbols of the codeword are equal to the message symbols, then the code is said to be systematic. k is referred to as the message length of the code and n is referred to as the block length. The ratio $\rho = k/n$ is the rate of the code. Roughly, this is the amount of information transmitted per codeword. For a code with minimum distance d, the code can be uniquely decoded for up to $\lfloor d/2 \rfloor$ errors.

Definition 1 (Error Correcting Code)—An error correcting code C over a fixed alphabet $\Sigma$ with minimum distance d, is a pair of maps (Encode,Decode), where Encode:$\Sigma^k \to \Sigma^n$ and Decode:$\Sigma^n \to \Sigma^k$, such that for all $m \in \Sigma^k$ and for all $c \in \Sigma^n$ such that $\Delta(c, \text{Encode}(m)) \le \lfloor d/2 \rfloor$, Decode(c) = m.

The channel used for transmission can be stateful or stateless (the latter is also called memoryless). A stateful channel can remember past messages sent and perform replays and corruptions dependent on past transmissions. A memoryless channel does not keep track of prior messages, and so any corruptions are dependent on the current message only. Naturally, schemes secure against a stateful channel are also secure against a memoryless channel. Stateful channels are considered in the exemplary embodiments.

Rateless Error Correcting Code

For codes such as Reed-Solomon codes, the ratio $\rho = k/n$ is called the rate of the code, i.e., what fraction of the codeword contains the "real" data. There are a class of error correcting codes called rateless (or fountain) codes that do not have a fixed block length n. These codes can generate a limitless stream of symbols (i.e., a continuous "fountain" of symbols) where the message can be recovered (with high probability) from any subset of a given size. If there are k input symbols, typically, the receiver will need $(1+\in)k$ symbols to decode the message with high probability ($\in$ is called the overhead of the code and is typically user configurable). For example, a Reed-Solomon code can be turned into a fountain code by simply encoding the file and then repeatedly evaluating the polynomial at a random point transmitting the result it to the receiver. There are several much simpler (and more efficient) fountain codes that are based on bipartite graphs, with LT codes and Raptor codes being the most common.

When encoding, an output symbol is the XOR of several messages symbols, where the number of message symbols is sampled according to a degree distribution D that may depend on k and a parameter $\delta$, that is, $D = D_{k,\delta}$. For LT codes, $D_{k,\delta}$ is often the robust soliton distribution. Note that the probabilistic nature of the encoding means that there is a non-zero probability that decoding will fail (i.e., the received sequence of at least $(1+\in)k$ code symbols does not cover all message symbols). This probability can be bounded by the parameter g. Note that the value of $\delta$ and the distribution D determine the possible values that the overhead $\in$ may have. In particular, for smaller $\delta$, a larger $\in$ is needed and vice versa. This relationship is denoted by $\in = f(D_{k,\delta}, \delta)$ For simplicity, the degree distribution is denoted simply by D (instead of $D_{k,\delta}$).

Definition 2 (Rateless Error Correcting Code)—A (k,D,$\delta$)-rateless error correcting code C over a fixed alphabet $\Sigma$ with degree distribution D, decoding failure probability $\delta$, and $\in = f(D_{k,\delta}, \delta)$ (for some function $f$), is a pair of maps (Encode,Decode), such that Encode maps from $\Sigma^k$ to infinite sequences of elements of $\Sigma$ (denote this set with $\Sigma^{\aleph_0}$ for convenience), such that for any $m \in \Sigma^k$ and any subsequence s of Encode(m) of size at least $(1+\in)k$, Decode(s) = m with probability at least $1-\delta$.

LT codes and Raptor codes are examples of a rateless error correcting code, where Raptor codes are based on LT codes. An LT code works by constructing a sparse bipartite graph with input symbols on one half, and parity symbols on the other half (input and parity nodes, respectively). The value of a parity node is the XOR of the input nodes connected to the parity node. The bipartite graph is constructed by first selecting the degree of a parity node from a particular distribution and then selecting the neighbors uniformly at random. The degree distribution used is the robust soliton distribution, described in Michael Luby, "LT Codes," Proc. of the 43rd Symposium on Foundations of Computer Science in FOCS '02, 271-281 (Washington, D.C., USA, 2002; IEEE Computer Society). This distribution ensures that the average node degree is $O(\log k)$ where k is the number of input symbols. Thus, using a balls-in-bins analysis, with $(1+\in)k$ output symbols, with high probability, every input symbol is covered by at least one output symbol and thus decoded. This implies that encoding and decoding take $O(k \log k)$ time. Decoding works via a straightforward belief propagation algorithm, as such it can only correct erasures and not errors. However, it is known that belief propagation can be augmented to correct errors, but then it must assumed that errors are random and that the erroneous value is uniformly distributed in $\Sigma$.

FIG. 1A illustrates an exemplary LT code 100, where an output symbol is the XOR ($\oplus$) of several randomly selected input messages symbols, where the number of message symbols is sampled according to a degree distribution D, in a known manner.

Raptor Code

Raptor (rapid tornado) codes are a particular kind of fountain code. They achieve linear time encoding and decoding (i.e., linear in the message size) and can achieve high data rates with low overhead. Raptor codes work in two phases. In the first phase, a linear-time erasure code (e.g., a low-density parity check code) is applied to the message generating a group of "intermediate symbols." In the second phase, an LT-encoding is used to produce each output code symbol by taking an O(1)-sized random subset of the intermediate symbols and XOR'ing them together. This process is repeated until enough symbols have been generated. Raptor codes are parameterized by the input message size k, the overhead $\in$, and a "degree" distribution D that is used to determine the number of symbols to XOR together to produce an output symbol. An asymptotically good distribution has been presented that is related to the Robust Soliton distribution. Note that Raptor codes are primarily erasure codes and do not necessarily tolerate symbol corruption well. There has been some work to analyze Raptor codes over noisy channels, but the noise is always assumed to be random rather than adversarial. Aspects of the present invention extend Raptor codes to endure (computationally-bounded) adversarial errors.

Figure 1B:
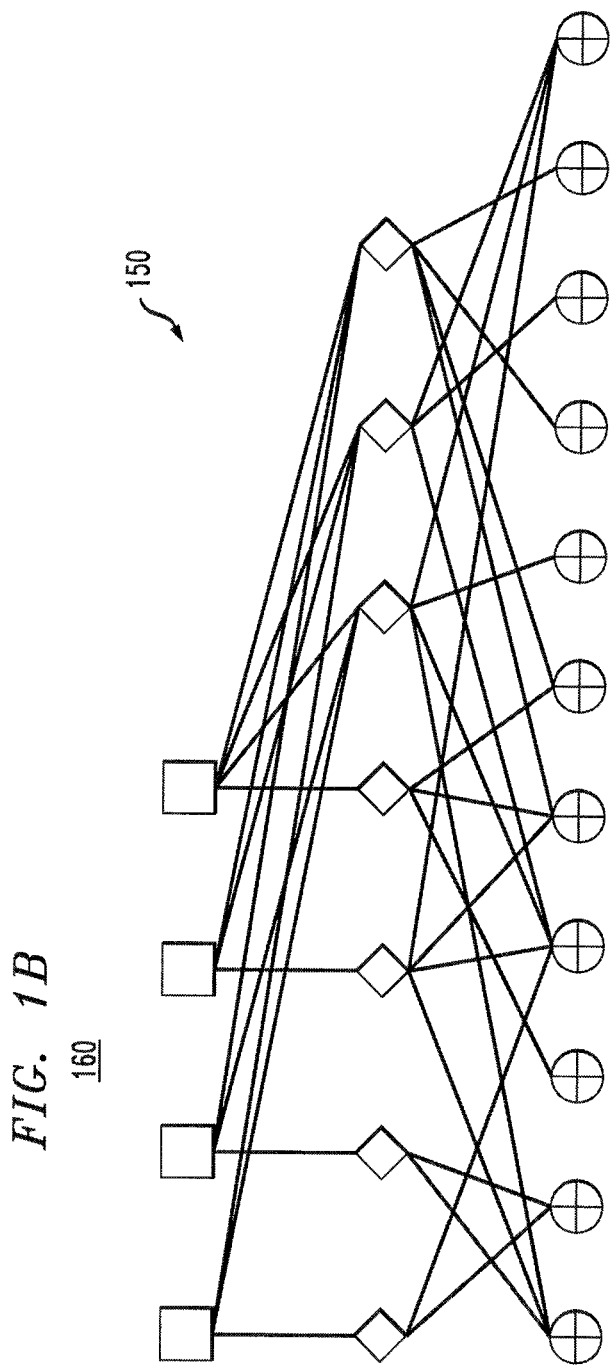
FIG. 1B illustrates an exemplary Raptor code.

FIG. 1B illustrates an exemplary Raptor code 150. The exemplary pre-code applied at level 160 of FIG. 1B to the input messages of FIG. 1A is a (7,4) Hamming code.

Overall, despite the fact that LT and Raptor codes are termed error correcting codes, they are primarily erasure codes, because their error correcting properties, if any, are significantly restricted.

Cryptography

The first basic cryptographic tool that is employed is a message authentication code (MAC) or another authentication value computed over one or more of the encrypted symbols, such as a secret key signature scheme. For simplicity but without loss of generality in what follows a MAC is employed, and as would become apparent to those skilled in art, equivalently any other secret key authentication value can be employed. A MAC is a secret-key scheme that produces a "tag" for a given message using the secret key. Only someone with the knowledge of the key can generate or verify the tag. MACs are generally much faster than signature schemes —on the order of 2 or 3 magnitudes faster—but require the distribution and protection of secret keys.

Definition 3 (Message Authentication Code)—A message authentication code (MAC) for a message space M and tag space T, is the triple of algorithms, M=(Gen,Mac,Verify Mac) where, Gen is a PPT algorithm that on input $1^\lambda$ outputs a key $k \in \{0,1\}^\lambda$. Mac is a PPT algorithm that on input $k \in \{0,1\}^\lambda$ and $m \in M$ outputs a tag $t \in T$. Verify Mac is a deterministic algorithm that on input $k \in \{0,1\}^\lambda$, $m \in M$, and $t \in T$ outputs a bit $b \in \{0,1\}$. For all $k \leftarrow Gen(1^\lambda)$ and all $m \in M$, Verify Mac(k,m,Mac(k,m))=1.

A secret-key cipher can generally be defined to have a key generation algorithm Gen, an encryption function Enc, and a decryption function Dec. Enc is allowed to be probabilistic, but Dec is required to be deterministic. Some definitions allow Dec to fail to decrypt an uncorrupted message with some small probability, but it is assumed that Dec never fails when given a legitimate message as input.

Definition 4 (Secret-Key Encryption Scheme)—A secret-key encryption scheme (or a symmetric cipher) for a message space M (with associated ciphertext space C), is the tuple of algorithms (Gen,Enc,Dec) where, Gen is a PPT algorithm that takes $1^\lambda$ as input and outputs a key k. Enc is a PPT algorithm that takes as input a key k and a message $m \in M$ and outputs a ciphertext $c \in C$. Dec is a deterministic algorithm that takes as input a key k and a ciphertext $c \in C$ and produces a message $m \in M$. For all $k \leftarrow Gen(1^\lambda)$ and all $m \in M$, Dec(k,Enc(k,m))=m.

In the present constructions, a pseudo-random number generator (PRNG or PRG) is utilized as an efficient source of random looking bits. A PRNG, given a short seed s, produces a (very) long sequence of random-looking bits. A PRNG is secure if its output is indistinguishable (in polynomial-time) from a string of random bits. Another way of defining this is that any algorithm that takes as input random bits behaves only negligibly different when given pseudo-random bits instead.

Basic Security Definitions

The standard definitions of security for the primitives defined above are presented, while the other security definitions will be introduced as needed. For MACs, it is desired that they are existentially unforgeable so that an adversary cannot forge a MAC for any message, even one of his or her own choosing. In the below definition, the adversary A has access to a MAC oracle $O_k$ that on input m produces t, a tag for the message. After some number of queries, A outputs a message and tag pair (m,t) and "wins" if the MAC verifies for m. It is required that m was not previously queried to the oracle.

Definition 5 (Existentially Unforgeable MAC)—A MAC scheme M is $\in$-unforgeable if for all PPT adversaries A given access to an oracle $O_k$ (where $O_k(m)$=Mac(k,m) for some $k \leftarrow Gen(1^\lambda)$), $$P[k \leftarrow Gen(1^\lambda); A^{O_k(\cdot)}(1^\lambda) \rightarrow (Q,m,t): m \notin Q \wedge \text{Verify Mac}(k,m,t)=1] \leq \eta(\lambda)$$

where Q is the list of oracle queries made by A and $\eta(\lambda)$ is a negligible function and the probability is taken over the random coins of A and the oracle $O_k$.

For symmetric ciphers, all information about the message m to be protected should be hidden. The most basic formulation of this notion of information hiding is termed semantic security and is captured in the following definition. Generally, a cipher "hides" all of the information about its message if any function $f$ of the message that can be computed with the ciphertext can be (efficiently) computed without the ciphertext.

Definition 6 (Semantic Security)—A symmetric cipher $\Pi$=(Gen,Enc,Dec) is (t,o,$\in$)-semantically-secure if for every efficiently-sampleable distribution D over message space M, all functions $h:M \rightarrow \{0,1\}^*$ and $f:M \rightarrow \{0,1\}^*$ (of arbitrary complexity) and every algorithm A running in time t, there is an algorithm A' that runs in time$\leq$t+o such that, $$P[m \leftarrow D; k \leftarrow Gen(1^\lambda); A(1^\lambda, Enc(k,m), h(m)) = f(m)] - P[m \leftarrow D; A'(1^\lambda, h(m)) = f(m)] \leq \in$$

where the probabilities are taken over the random coins of D, Gen, Enc, A, and A'. The parameter o is the "overhead" required for A' to produce the same output as A.

In the present construction, a pseudo-random number generator (PRNG) is utilized as an efficient source of random looking bits. A PRNG, given a short seed s, produces a (very) long sequence of random-looking bits. A PRNG is "secure" if its output is indistinguishable (in polynomial-time) from a string of random bits, as discussed hereinafter.

Definition 7 (PRNG Indistinguishability)—A pseudo-random number generator $G:\{0,1\}^\lambda \rightarrow \{0,1\}^m$ is $(t,\in)$-indistinguishable (or $(t,\in)$-secure) if for all PPT A running in time at most t, $$|P[x \leftarrow U_m; A(x)=1] - P[s \leftarrow U_\lambda; A(G(s))=1]| \leq \in$$

where $U_n$ is the uniform distribution over strings of length n.

Assume that m is large enough that pseudo-random bits output by G will not run out (and hence require a re-seeding).

Security Model

Next, a general security model against computationally bounded adversaries is described that is applicable to both fountain and block codes. Much past work has considered computationally bounded adversaries against block codes. Richard J. Lipton, "A New Approach to Information Theory," 11th Annual Symp. On Theoretical Aspects of Computer Science, Vol. 775 of Lecture Notes in Computer Science, pages 699-708 (Springer Berlin Heidelberg, 1994), models a computationally bounded adversarial channel that can corrupt at most a ρ-fraction of the symbols. Anna Lysyanskaya et al., "Multicast Authentication in Fully Adversarial Networks," Proc. of the 2004 IEEE Symp. on Security and Privacy, pages 241-255 (IEEE, 2004), considers an (α,β)-network (or channel), where at least α-fraction of packets (symbols) that are sent survive and at most β-times extra symbols are received. That is, this model allows for insertion of new symbols into the codeword or multiple versions of a specific symbol arriving. Silvio Micali et al., "Optimal Error Correction Against Computationally Bounded Noise," Proc. of the 2nd Int'l Conf. on Theory of Cryptography in TCC '05, 1-16 (Berlin, Heidelberg, 2005), gives a more involved game the includes several rounds of encoding, corrupting, and decoding between a sender, receiver, and the adversarial channel.

These security models can only apply to block codes: in particular, the models gave explicit bounds on the amount of corruption introduced by the adversary. However, since fountain codes can produce an unbounded number of symbols, the amount of corruption introduced by the adversary can continually grow and become arbitrarily close to 1. A more accurate model for a rateless code is to lower-bound the amount of non-corruption rather than upper-bound the amount of corruption. That is, some minimum number of "good" symbols is ensured and the remainder can be bad. In a block code, this lower-bound on goodness implies an upper-bound on badness, and hence this model subsumes previous corruption models for block codes.

Next, the definition of a secret-key fountain coding scheme or equivalently a private fountain coding scheme is given. It is based on the definition of a secret-key coding scheme given in Silvio Micali et al, "Optimal Error Correction Against Computationally Bounded Noise," since that definition is the most consistent cryptographic-style definitions, but the parameters and function definitions are changed to suit also fountain codes instead of only block codes.

Definition 8 (Private Fountain Coding Scheme) A (k,D, δ)-private fountain coding scheme consists of three probabilistic, polynomial-time, algorithms Gen, Encode, and Decode, a finite alphabet Σ, degree distribution D, a positive integer λ (the security parameter), a positive real δ>0 (the probability of decoder failure), and overhead $\in = f(D,\delta)$ (for some function $f$), described as CS=(Gen,Encode,Decode,λ, k,D,δ), where for all sufficiently large message lengths k:

Gen: on input $1^\lambda$, Gen outputs a random λ-bit string sk, called the secret key.

Encode: on input the secret key sk, a nonce n, degree distribution D, decoding failure probability δ, the message $m \in \Sigma^k$, Encode outputs a string $c \in \Sigma^*$, referred to as an encoding of m, such that $|c| \geq (1+\in)k$, (let $|c|$ be denoted by N).

Decode: on input the secret key sk, degree distribution D, decoding failure probability δ, string $r \in \Sigma^*$, where $|r| \geq (1+\in)k$, Decode outputs a string $m' \in \Sigma^k$ with probability at least 1−δ or fails to even decode and outputs ⊥, where m' equals m with overwhelming probability in the security parameter λ.

For a block code, as would be apparent to those skilled in art, the above definition can be adapted by simply dropping the input parameter D, setting δ=0 and appropriately setting s according to the desired rate of the block code. Indeed, D can be dropped since there is no degree distribution to employ in a block. Also, δ=0 since there is no decoding failure probability due to a insufficiently small number of received encoded symbols. Finally, since there is no explicit additional overhead incurred by the probabilistic symbol construction via XORing that is also induced by the degree distribution D (other than the redudancy defined by the rate of block code), the overhead ∈ can simply be set to capture the desired rate ρ of the code as $\in = 1/\rho - 1$. Thus, a block code is denoted with the 4-tuple CS=(Gen,Encode,Decode, λ,k) and is simply called a private block coding scheme.

The definition for a private fountain coding scheme is asymptotic. The bound on the probability of decoding failure δ is dependent on the degree distribution used. In addition, due to the probabilistic nature of the encoders, the bound δ holds when there are "enough" code symbols produced.

Security Game

Security is defined in terms of a game that the adversary seeks to win. The goal is to reduce the adversary $\mathcal{A}$ to be no more powerful than the random erasure channel. In the random erasure channel, the channel chooses whether or not to erase a symbol independently of other symbols; moreover, for a given symbol whether the erasure occurs with probability p for some $p \in (0,1)$, denote this probability distribution $REC_p$. Note that p is restricted so that 1−p is non-negligible; that is, the expected fraction of symbols to not be erased is non-negligible. This is to avoid the degenerate case where a PPT $\mathcal{A}$ simply erases every symbol since that would be no more powerful than a random erasure channel where p is negligible. For a block code with message length k and block length N, it is assumed that $p \in (0, 1-k/N)$.

There are three participants in the game: the encoder Encode, decoder Decode, and the adversary $\mathcal{A}$. Encode and $\mathcal{A}$ are both PPT algorithms while Decode is a deterministic algorithm. The game consists of two phases: a "learning" phase and an "attack" phase. In the learning phase, there is a sequence of rounds where, in each round: (i) A selects a message m to be encoded by Encode; (ii) Encode initializes itself with m; (iii) A then queries different symbols from Encode (i.e., A is given oracle access to Encode through oracle $O_m$); (iv) A outputs the final (corrupted) codeword c' consisting of N symbols in Σ or ⊥; (v) c' is given to Decode who then attempts to decode; (vi) Decode's output is then given to $\mathcal{A}$. Eventually, $\mathcal{A}$ decides to exit the learning phase and continues with the attack phase. The events then proceed as in the learning phase, except, instead of giving Decode's output m' to A, m' is checked. If Decode failed to decode (i.e., outputted ⊥) or decoded to the wrong message (i.e., m'≠m), then A wins. Otherwise, A loses. Note that, in normal operation over a random erasure channel, the probability that Decode fails to decode is bounded by δ. It is desired to ensure that the probability that A wins the game is at most negligibly greater than δ. A interacts with oracle $O_m$ by providing an index i as input and the oracle $O_m$ returns the i-th code symbol. If the code is a block code and i>N, then $O_m$ returns ⊥.

The game is detailed in FIG. 2. Although the description of the game in FIG. 2 is primarily suited for a fountain code, it is straightforward to refine or relax the exemplary game to cover also a block code. Accordingly, let π be the input parameters for the game. For a fountain code, $\pi=(1^\lambda, k, D, \delta)$; for a block code, $\pi=(1^\lambda, k)$, where $1^\lambda$ is the security parameter. Let CS=(Gen,Encode,Decode,λ,k,D,δ) be a private fountain coding scheme and let CS=(Gen,Encode,Decode,λ,k) be a private block coding scheme. Note that if in the game of FIG. 2, q=0, i.e., A makes no queries, then there is a memoryless channel.

Computational Secure Private Fountain Coding Schemes

A computationally secure private fountain or block coding scheme is next defined. Intuitively, it is desired to ensure that the adversary A is only negligibly more likely to cause a decoding error or failure than an adversary who attacks the code word at random. Thus, the random adversary R is initially defined. This adversary R takes as input the input parameters π and a probability p, where 1−p is non-negligible. R then proceeds as follows: (i) R computes $\in=f(D_k, \delta, \delta)$; (ii) R makes no learning queries and chooses an arbitrary message $m \in \Sigma^k$ and outputs (⊥, m); (iii) R then queries $O_m$ for sequential symbols; (iv) For each symbol σ, R flips a coin and with probability p it erases the symbol, otherwise R adds the symbol to a list; (v) When R has more than (1+∈)k symbols in the list, R outputs the list and exits. Note that the output of R is distributed identically to $REC_p$.

Let CS be a private fountain or block coding scheme, and let $ExpAdv_{A,CS}(\pi)$ be the experiment $CorruptExp_{A,CS}(\pi)$ as defined above, where A is a PPT adversary. Define $ExpRand_{CS}(\pi)$ to be the experiment $CorruptExp_{R,p,CS}(\pi)$ where the adversary participating in the game is the random adversary $R_p$ defined above with parameter p for the erasure probability with symbol erasure distribution $REC_p$ and 1−p is non-negligible. Define $Adv_{A,CS}(\pi)=|P[ExpAdv_{A,CS}(\pi)=1]-P[ExpRand_{CS}(\pi)=1]|$. A private fountain or block coding scheme is defined to be (t,∈)-secure if A runs in time at most t and $Adv_{A,CS}(\pi) \le \in$. For a memoryless adversarial channel, A makes no learning queries. More formally, and taking also into consideration the number of queries made by the adversary the following definition can be provided.

Definition 9 (Computationally Secure Private Fountain Coding Scheme)—A private fountain (or block) coding scheme CS is (t,q,∈)-secure if, for all PPT adversarial channels $\mathcal{A}$ running in time t and making at most q queries, and for all sufficiently large k, $Adv_{A,CS}(\pi) \le \in$ (where $\pi=(1^\lambda, k,D,\delta)$ for a fountain code and $\pi=(1^\lambda,k)$ for a block code).

Note that the probability bound s above should clearly not be confused with the overhead ∈ in the definition of a private LT coding scheme.

Finally, it is noted that a secure private fountain or block coding scheme by definition ensures the integrity protection of the received coded symbols and the reconstruction of the original message independently of the malicious manipulation of the encoded symbols by an adversary. Therefore, a secure private fountain or block coding scheme provides both some implicit form of authentication for the underlying encoded symbols and also error correction properties. Therefore, in what follows, the term of authenticated error correcting code is generically used to describe a code that by design is a computational secure (fountain or block) private coding scheme. In the following constructions, the focus will be on such authenticated error correcting LT and Raptor codes. All of the exemplary following constructions can be shown to comprise computationally secure (fountain or block) private coding schemes according the definitions described above.

Authenticated Error Correcting LT Code Constructions

Three exemplary constructions are presented for authenticated error correcting LT codes incorporating aspects of the present invention. A basic construction is presented that is relatively straightforward to describe and easy to implement, but this construction may not scale well to large inputs and may require a large number of pseudo-random bits. A "block scalable" construction is also presented that is more involved in its design but can handle much larger input files. A third "random scalable" construction is also presented that can encode large files. The first and the third constructions comprise rateless private coding schemes whereas the second construction comprises a block or fix-rate private coding scheme. The first two exemplary constructions maintain logarithmic-time encoding and decoding whereas the third construction incurs an additional logarithmic overhead, as discussed further below.

All three constructions comprise secure extensions of LT codes and therefore can be used to secure any code that is based on such codes. LT codes are a family of erasure codes that are efficient both theoretically (with O(k log k) encoding and decoding times) and practically. Their analysis was originally over the binary erasure channel, though the algorithms easily generalize to larger code symbols. The encoder works by selecting a number of message symbols to be combined together—the number is sampled according to the Robust Soliton distribution, detailed in Micheal Luby, "LT Codes," Proceedings of the 43rd Symposium on Foundations of Computer Science, FOCS '02, pages 271-281, Washington, D.C., USA, 2002, published by IEEE Computer Society. The mean number of message symbols combined together is O(log k). (The logarithmic number comes from a balls-in-bins analysis, to ensure that with high probability every input symbol is part of at least one output symbol.) This mapping of input symbols to output symbols induces a sparse bipartite graph on the symbols.

While there has been some work on extending LT codes to withstand errors, it is not clear how to modify the decoding algorithms to allow LT codes to correct arbitrary errors in addition to erasures. The exemplary constructions presented below provide resilience to any adversarial corruptions of symbols (according to the security model described above).

Raptor codes comprise an erasure code that is derived from LT codes. They consist of linear-time encoding and decoding algorithms that are also designed and analyzed for a channel with random erasures, and they can also operate with both binary and non-binary larger symbols. Raptor codes operate by first applying a "pre-code" to the input message to obtain a set of intermediate symbols. These intermediate symbols are then used as input to an LT-encoder as explained above. As described in RFC5053 (later amended and improved in RFC6330), Raptor codes may be using a simple checksum (e.g., CRC32) to detect any random corruptions of the encoded symbols. While this may be sufficient for small, random errors, it will crumble quickly when faced with an adversarial channel.

As it will become obvious to those skilled in art, the explenary constructions presented below for (rateless or block) authenticated error correcting LT codes can be trivially transformed to authenticated error correcting Raptor codes that achieve resilence to any adversarial corruptions (according to the security model described above), while maintaining the ratelessness of the code and the asymptotic efficiency of the encoding and decoding.

Basic Construction for Authenticated Error Correcting LT Codes

Let Encode and Decode be the encoding and decoding functions for the LT code. As a first step, a cryptographically-strong PRNG is used in Encode to select the message symbols that will be combined to produce an output symbol. This ensures that the structure of the bipartite graph used in the LT code is unpredictable to the adversary. Thus, intuitively, the adversary will not be able to exploit the structure of the graph to induce a decoding failure (this can be shown formally but omitted in the current invention). After applying the LT code, all of the code symbols are encrypted to ensure that A cannot examine the content of the output symbols and "reverse engineer" the underlying graph. Finally, a MAC is computed over each encrypted symbol and append this symbol to detect any corruption of the data. The degree distribution used for the LT code would be the Robust Soliton distribution, as specified in the original LT code paper Michael Luby, "LT Codes," IEEE Computer Society, Proc. of the 43rd Symposium on Foundations of Computer Science, FOCS '02, 271-281 (Washington, D.C., USA, 2002).

FIG. 3 illustrates an exemplary encoding 300 via authenticated error correcting LT codes in accordance with aspects of the present invention. As shown in FIG. 3, the LT code is applied to the message symbols during layer 310 using a PRNG G and the code symbols are encrypted and a MAC is applied (appended) to the encrypted symbols during layer 320.

FIG. 4 illustrates exemplary pseudo code 400 for an exemplary implementation of a first embodiment for encoding authenticated error correcting LT codes. As shown in FIG. 4, the LT code is applied during step 410 using a PRNG G and the code symbols are encryped and a MAC is applied (appended) to the encrypted symbols during step 420.

Note that for the MACs to be secure, the length of the input to the MAC must be at least as large as the security parameter. This restricts the disclosed scheme to message alphabets where each symbol is at least $1^\lambda$ in size. For typical applications, this will be 10 or 16 bytes. It is possible to authenticate multiple symbols with a single MAC, but the corruption of one symbol would cause many other (possibly good) symbols to be discarded, resulting in corruption amplification during decoding. However, it is noted that in a channel where errors are bursty, authenticating multiple symbols is quite reasonable since, if one symbol is corrupted then its neighbors likely are as well. For the remainder of this discussion, it is assumed that each MAC authenticates a single symbol.

Appending MACs to code symbols results in an increase in the overhead per symbol. For a block code, this decreases the rate by a factor of $m/(s+m)$ where m is the MAC size and s is the symbol size. For a rateless code, the "rate" is unaffected (since there is no rate), but the number of raw bits transmitted increases also by a factor of $m/(s+m)$. Note that if $s=m$ (the minimum symbol size), then the number of bits sent is doubled (cutting the rate of the code in half for a block code). However, if $m \ll s$, then this overhead is marginal (e.g., $s=1024$ bytes and $m=16$ bytes, then the overhead is a factor $1/64 \approx 1.5\%$). If l symbols are authenticated per MAC, then the overhead decreases to $m/(ls+m)$.

FIG. 5 illustrates exemplary pseudo code 500 for an exemplary implementation of a first embodiment for decoding authenticated error correcting LT codes. Generally, decoding the produced symbols by the authenticated error correcting code above is straightforward: First the integrity of the received symbols is checked by verifying the corresponding MACs of the symbols, and if this check succeeds, the symbols are decrypted and added to a current set of authenticated received symbols. Using the strong PRNG, these symbols are processed and decoded to form the final output (original) decoded symbols.

Generalizing Basic Construction

Note that the basic construction can enhance other rateless codes such as Raptor codes. Authenticated error correcting Raptor codes are realized by applying the basic construction to the LT-coding step of Raptor codes, using a strong PRNG, secure encryption, and unforgeable MACs as before. This secures Raptor codes against adversarial corruptions. As with authenticated error correcting LT codes, the MACs are used to detect the corruption, and the encryption and strong PRNG ensure that the underlying bipartite graph structure remains completely unknown to the adversary. The degree distribution used would be the distribution used in Amin Shokrollahi, "Raptor Codes," IEEE/ACM Transactions on Networking, 14(SI):2551-2567, June 2006. Decoding authenticated Raptor codes proceeds by applying the above authenticated LT-decoding algorithm to the LT decoding step in the Raptor decoding algorithm and leaving the rest of the Raptor decoding unchanged.

Figure 6:
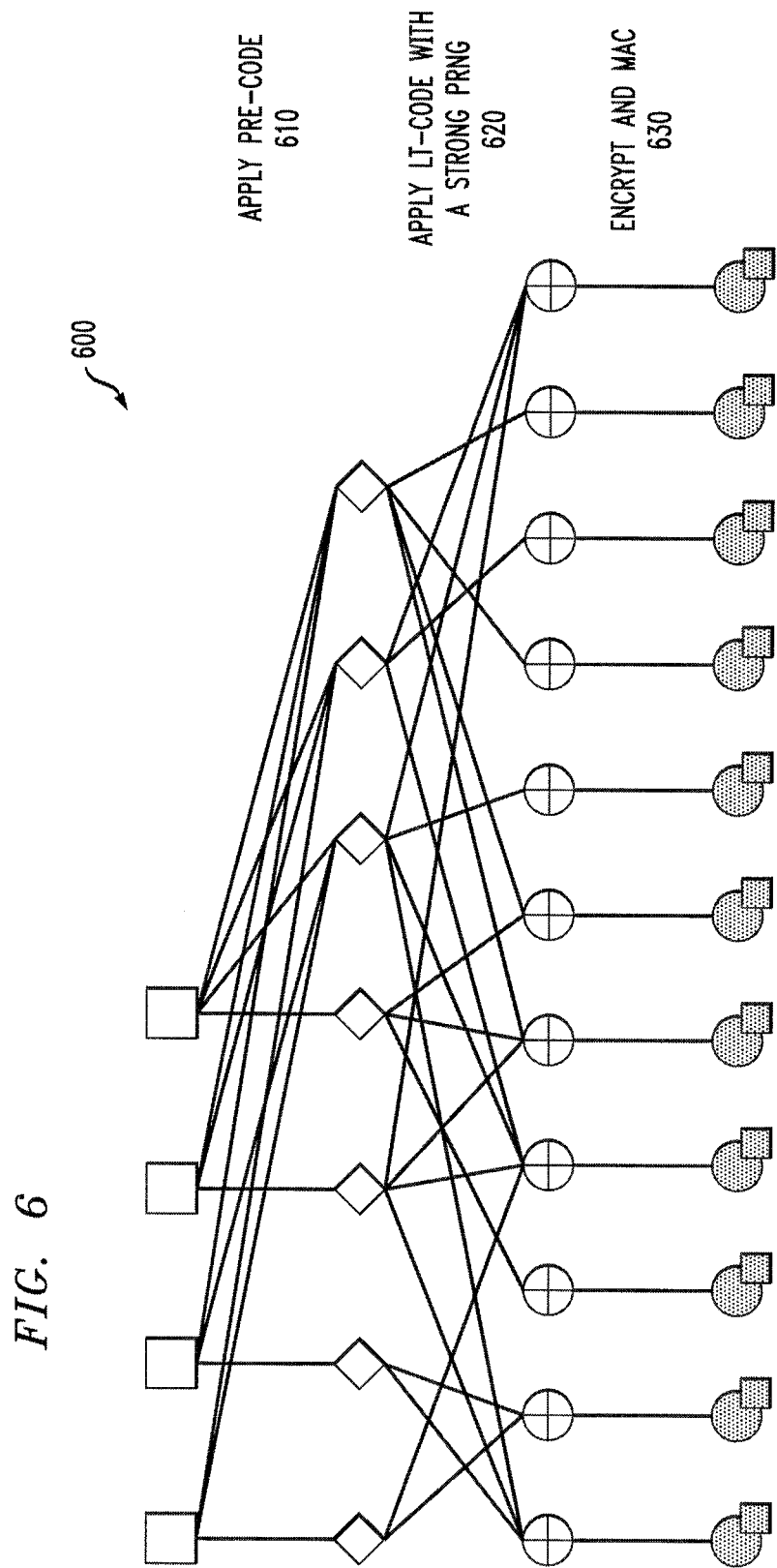
FIG. 6 illustrates an exemplary application of encoding via authenticated error correcting LT codes to provide an authenticated error correcting Raptor code in accordance with aspects of the present invention.

FIG. 6 illustrates an exemplary application 600 of the basic construction of an authenticated error correcting LT codes to provide an authenticated error correcting Raptor code in accordance with the above generalization. As apparent to those skilled in the art, similar generalizations can be considered also for the two constructions described below. That is, the next two exemplary constructions can be appropriately applied to a Raptor code encoding to finally provide corresponding authenticated error correcting Raptor codes.

Block Scalable Construction for Authenticated Error Correcting LT Codes

The basic authenticated error correcting LT code presented above is both simple and efficient, but it may suffer from scalability problems. In particular, if the input file (plus the internal state of the encoder) does not fit into main memory, then the operating system will need to continually swap pages in and out. In particular, since the encoder combines (on average) a logarithmic number of randomly chosen message symbols to produce an output symbol, the system will need to perform a logarithmic number of random disk reads to produce a single output symbol. Magnetic disks typically have random read latencies around 5-10 milliseconds while solid state drives (SSDs) have read latencies on the order of 10 s of microseconds. But both of these read latencies are orders of magnitude larger than the 10 s of nanoseconds required to read from RAM. Hence, the large amount of IO required when paging in and out may result in a slowdown for the encoder and decoder. Another issue is that the basic code requires the use of a cryptographically strong PRNG, which can be several times slower than a weak (i.e., insecure) PRNG. For instance, with a 512 MB input file and 256-byte symbols, the secure LT encoding and decoding may be approximately 40% slower than when using a weak PRNG, not including the time to encrypt and MAC the symbols.

To address the above issues, the second exemplary construction employs a simple divide-and-conquer strategy. The main idea is to divide the input into blocks and then encode each independently using the basic construction for authenticated error correcting LT Codes that is described above on each block using a weak PRNG instead of a strong PRNG. This allows for easy parallelization and a much more limited amount of the file that must be resident in memory at any given time. After encoding each block, the produced symbols of all the blocks are randomly permuted together.

Figure 7:
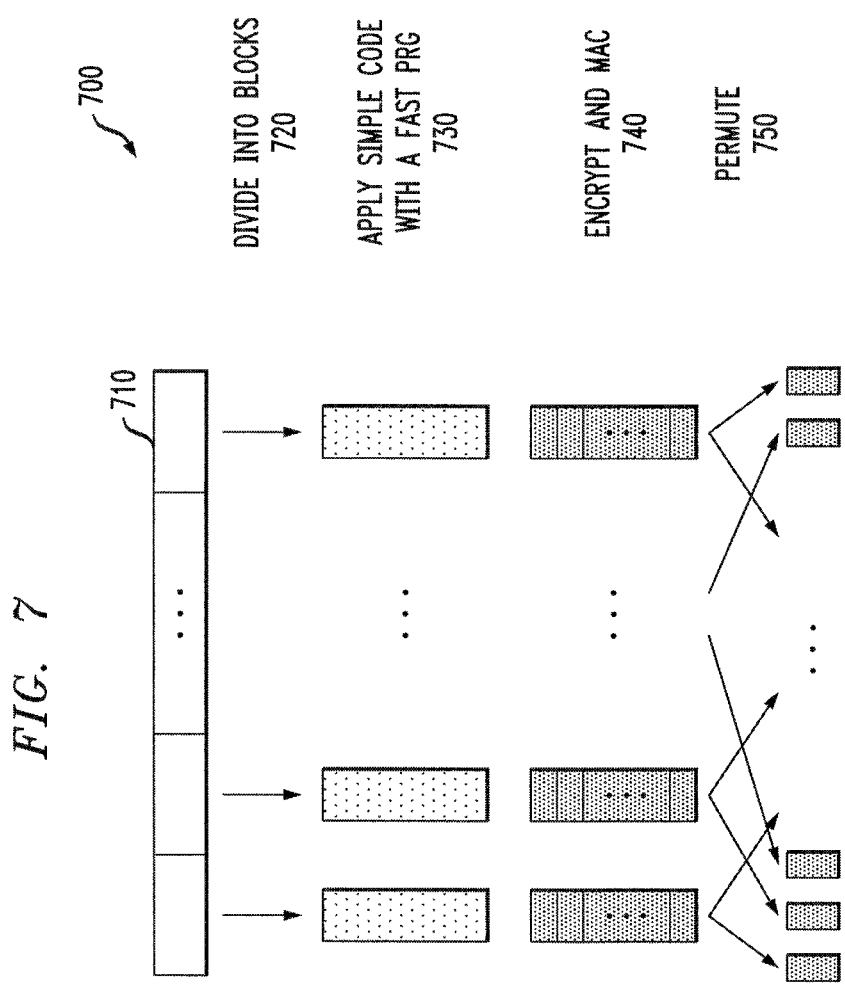
FIG. 7 illustrates an exemplary implementation of a block scalable authenticated error correcting LT code.

FIG. 7 illustrates an exemplary implementation of a scalable authenticated error correcting LT code 700. Intuitively, a divide-and-conquer strategy is employed for the scalable construction. As shown in FIG. 7, the input 710 is divided into blocks during step 720 and then each block is encoded independently. In particular, the basic code that corresponds to the construction for authenticated error correcting LT Codes that is described above is applied to each block with a fast (weak) PRNG during step 730 to produce for each block a corresponding fixed number of output encoded symbols, and then each such output encoded symbol is encrypted and a MAC is applied during step 740. In this manner, the authenticated error correcting LT code is applied to each block of the input message.

After encoding each block, the symbols of all the blocks are randomly permuted together during step 750. Thus, the output symbols from all of the LT-encodings are permuted together to form the final output. This random permutation ensures that any corruptions performed by A are distributed uniformly among all blocks and also uniformly within each block. Note that this allows a weaker but faster PRNG to be used when encoding each block since the random permutation during step 750 ensures that A can only corrupt symbols at random. Note that in this scalable second scheme, at most a single random IO is needed to output a given output symbol, whereas the first encoder described above will likely perform several random IOs (at most the degree of the symbol) for each output symbol.

However, there are some situations where an explicit permutation of the symbols during step 750 may be quite expensive. The explicit permutation requires fully encoding each block and buffering all of the output symbols before permuting them, which could use a large amount of resources for the client running the encoder. For instance, if the whole file barely fits into memory, encoding every block and then permuting will cause a lot of swapping. (A good amount of speed can be gained by permuting pointers to the symbols rather than the symbols themselves, but that is just a layer of indirection.)

Fortunately, the permutation step 750 need not be explicit. Instead, in such situations as described above, an implicit permutation can be employed. The general idea is as follows: a random permutation is defined and the final encoded symbols are generated in the order of their final position (i.e., after the permutation would have been applied). This allows the encoder to output the encoded symbols in a streaming manner instead of buffering. In particular, the permutation may be implicit so that the encoded symbols within each block are generated "out of order" and overall the final output encoded symbols are produced in "reverse, bottom-up" fashion in the schematic description of the code in FIG. 7. Indeed, if the first output symbol after the permutation is symbol i from block j, then symbol i is generated and output from block j before computing symbols 1 through i−1 in block j (or any other block). This allows buffering to be avoided since once a symbol is generated, it is already in its final position and can simply be output. This idea places an additional requirement on the PRNG in use. Specifically, it is required that the PRNG state can be easily and quickly reset to produce a desired segment of pseudo-randomness. For instance, the state for each symbol could be derived from the key, block number, and symbol number. Intuitively, it is needed to be able to appropriately "fast-forward" and "rewind" the PRNG state as the symbols are encoded within each block.

Decoding the block scalable error correcting LT codes is simple. The symbols are received and then permuted to undo the random permutation performed by the encoder. Then, each block is decoded separately where the block-level decoding proceeds as described above in the basic scheme. Finally, each decoded block is concatenated together to produce the final decoded message. As before the permutation step can be implicit, when a symbol is received the decoder can determine which block the symbol belongs to and give that symbol to the decoder for that block. The decoder for the block can then update the partial decoding for its block. In this way, each block is incrementally decoded as the symbols arrive.

One issue not addressed yet (that applies regardless of whether the permutation is explicit or implicit) is how the adversarial corruption of symbols can affect the decoding failure probability of the code. Since the symbols of each block are all combined together uniformly at random, the number of corruptions in a given block is binomially distributed, and it can be shown that the corruption probability remains exponentially small in the security parameter.

FIG. 8 illustrates exemplary pseudo code for an encoding algorithm 800 for a scalable authenticated error correcting LT code using an explicit permutation on the parity (encoded) symbols.

FIG. 9 illustrates exemplary pseudo code for a decoding algorithm 900 for a scalable authenticated error correcting LT code using an explicit permutation on the parity (encoded) symbols.

Error Analysis

If the adversary A corrupts a symbol, the block containing that symbol is uniformly distributed among all blocks. This is modeled as a balls-in-bins scenario where a ball is a corrupted symbol and a bin is a block. Suppose each block has k input symbols and is encoded into n' output symbols. If there are b blocks, then there are N=bn' total output symbols. If a γ-fraction are corrupted, then there are γbn' corrupted symbols distributed among the blocks. Since the block containing a given corrupted symbol is uniformly distributed among all blocks, the probability of corruption "landing" in particular block is $p=\frac{1}{b}$. Moreover, the number of corruptions $X_B$ for a given block B is a binomially distributed random variable.

Since the corruptions are binomially distributed, there is no way to ensure (i.e., with probability close to 1) that each block receives at most a fixed number of corruptions. Thus, some additional redundancy must be added to absorb some of the variance in the number of corrupted symbols. Say the amount of redundancy is increased in each block by a factor of (1+τ). These additional symbols decrease the efficiency of the code and so it is desired to minimize the value of r. But, adding this additional redundancy also gives more symbols for A to corrupt. If a block is encoded so that it can tolerate (1+τ)γn' corruptions, then the survival rate is 1−(1+τ)γ. Thus, $$n' = \frac{1}{1-(1+\tau)\gamma}(1+\varepsilon)k$$

symbols in a block are generated.

A Chernoff-bound can be used to bound the tail of the binomial distribution, i.e., the probability that there are more than $(1-\tau)\gamma n'$ corruptions in a block. In particular, for a binomially distributed random variable X with mean $\mu$ and for some $\tau>0$, $$P(X \geq (1+\tau)\mu) \leq \left(\frac{e^\tau}{(1+\tau)^{(1+\tau)}}\right)^\mu.$$

The parameter $\tau$ is the amount of additional redundancy generated for each block to absorb the variation in the number of corrupted symbols. For the binomial distribution with the present parameters, $$\mu = \gamma pN = \gamma \frac{1}{b}N = \gamma n'.$$

It is desired that the right hand side is exponentially small in the security parameter while also minimizing the value of $\tau$. Suppose the probability is desired to be less than some value q. Note that the equation, $$\left(\frac{e^\tau}{(1+\tau)^{(1+\tau)}}\right)^\mu \leq q$$

is not solvable algebraically in terms of $\tau$. However, the equation can be solved numerically. Take the following parameterization. The input message consists of k=15000 symbols in each b=100 blocks and the decoding overhead is $\varepsilon=0.05$. The adversary $\mathcal{A}$ corrupts a $\gamma=0.2$-fraction of the output symbols. A $\tau$-fraction additional redundancy is added to each block. Thus, each block consists of $$n' = \frac{1}{1-0.2(1+\tau)}(1+0.05)15000 = \frac{15750}{0.8-0.2\tau}$$

symbols and the average number of corrupted symbols is $$\gamma n' = \frac{3150}{0.8-0.2\tau}.$$

Suppose that $P(X \geq (1+\tau)\mu) \leq q = 2^{-128}$ is desired. Solving for $r$ using the present approximation, $\tau=0.21354$. If the tail of the binomial distribution is calculated exactly, the value of $\tau$ is approximately 0.20788. So, the approximation overestimated the necessary redundancy by approximately 2.7%.

Asymptotic Efficiency

Plain LT codes are very efficient both theoretically and practically. The encoding and decoding algorithms are both O(k log k) and this is a property to be preserved in the authenticated error correcting codes. The basic authenticated error correcting code described previously maintains O(k log k) encoding and decoding in a straightforward way. With the scalable variant, extra redundancy is added, so the asymptotic running time may increase. In this section, it is shown that the additional redundancy is o(1) and so O(k log k) encoding and decoding is maintained. Recall that the Chernoff bound on the tail of the binomial distribution, $$P(X \geq (1+\tau)\mu) \leq \left(\frac{e^\tau}{(1+\tau)^{(1+\tau)}}\right)^\mu$$

where $$\mu = \frac{\gamma}{1-(1+\tau)\gamma}(1+\varepsilon)k$$

is the mean number of corruptions per block. Note that if $$\mu' = \frac{\gamma}{1-\gamma}(1+\varepsilon)k$$

(note that $\mu'$ is independent of $\tau$), then $$\left(\frac{e^\tau}{(1+\tau)^{(1+\tau)}}\right)^\mu \leq \left(\frac{e^\tau}{(1+\tau)^{(1+\tau)}}\right)^{\mu'}.$$

If the right-hand side is bounded by q, then, $$\mu' \ln\left(\frac{e^\tau}{(1+\tau)^{(1+\tau)}}\right) \leq \ln q$$

$$\mu'(\tau - (1+\tau)\ln(1+\tau)) \leq \ln q$$

$$\tau - (1+\tau)\ln(1+\tau) \leq \frac{\ln q}{\mu'}$$

$$(1+\tau)\ln(1+\tau) - \tau \geq \frac{-\ln q}{\mu'}.$$

Since the left-hand side is monotonically increasing, to minimize $\tau$, the two sides must be set equal. Thus, $$(1+\tau)\ln(1+\tau) - \tau = \frac{-\ln q}{\mu'}$$

$$(1+\tau)\ln(1+\tau) - \tau = \frac{-(1-\gamma)\ln q}{\gamma(1+\varepsilon)k}.$$

Since $\gamma$, q, and $\varepsilon$ are constants, $$(1+\tau)\ln(1+\tau) - \tau = O\left(\frac{1}{k}\right) = o(1).$$

Moreover, since $\tau = o((1+\tau)\ln(1+\tau))$, $\tau = o(1)$. Thus, $\mu$ and $\mu'$ are asymptotically equal. Since $\mu'$ is a linear function of k, linear-time encoding and decoding are preserved.

Random Scalable Construction for Authenticated Error Correcting LT Codes

The "block scalable" construction given above, via its divide-and-conquer strategy, achieves better scalability than the basic construction. Indeed, it can be shown that the block scalable construction achieves a 20% speed-up for an input file size of 512 MB; the speed-up may be much larger for bigger files. However, the block scalable construction results in a code that is not a rateless code but rather a block code. The explicit permutation that is applied to all symbols across all blocks precludes the possibility of the construction being rateless since the exact number of output symbols (as the sum of fixed numbers of symbols produced by applying the basic secure LT code at each block) must be known in advance to even create (define) the permutation.

Figure 10:
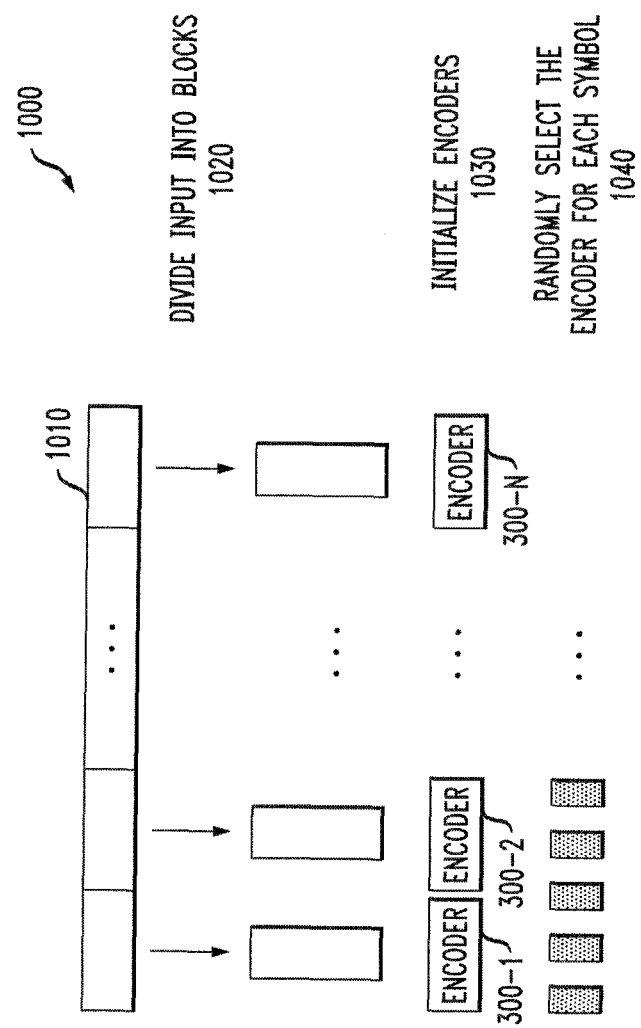
FIG. 10 illustrates an exemplary implementation of a random scalable authenticated error correcting LT code.

An alternative construction, given below, can be used to derive a rateless scalable authenticated error correcting code. FIG. 10 illustrates an exemplary implementation 1000 of a random scalable authenticated error correcting LT code. As shown in FIG. 10, the input 1010 is divided into blocks during step 1020, in a similar manner to the construction of FIG. 7, and then the basic authenticated error correcting LT code is applied to each block independently and "in parallel" and again in "reverse, bottom-up" fashion (with respect to the schematic description of the block scalable code in FIG. 7). As shown in FIG. 10, encoders 300-1 through 300-N, are used to encode N corresponding blocks. The encoders 300 can be implemented as discussed above in conjunction with FIG. 3 and are initialized during step 1030. A given block is iteratively selected at random during step 1040 and its next LT code symbol is output, (and this process is repeated) until there are enough final output symbols. This is different from the implicit permutation of the block scalable construction above in that each block's encoder outputs its symbols in order (according to the ordering induced by the pseudo-randomness that corresponds to this block and that is produced by a possibly block-specific strong PRNG) rather than in a random fashion (that is, a random permutation of the ordering induced by the pseudo-randomness corresponding to this block). So, the first symbol output is the first symbol of the j-th block, where j is selected at random. The next symbol is either the first symbol of some other block, or the second symbol of block j, and so on. This construction retains the ratelessness of the original basic construction since new output encoded symbols can be produced by simply keeping selecting blocks at random, running the corresponding encoder to produce a next symbol and outputting such symbols after being encrypted and MACed. That is, in contrast to the second block scalable construction, the encoder of each block of the third exemplary construction does not necessarily produce a fixed number of encoded symbols.

In more detail, the input message is broken into blocks and each block i has its own independent encoder 300-i. Each encoder 300 may have its own strong PRNG with a unique random seed. Another strong PRNG can be seeded and used to iteratively select the next block to output a symbol during step 1040. Since a separate LT code is used on each block, this process can continue for as long as desired. Since each output symbol is from a block selected at random, the adversary cannot focus his corruptions on a particular block and cause too much corruption in that block.

To decode, the symbols are received and the strong PRNG is used to determine the block to which the symbol belongs. The decoder for a block receives its symbols and decodes its block according to the basic construction described above. As before in the block scalable code, the decoding at the block level can proceed either incrementally (i.e., as the symbols arrive) or all at once when enough symbols have arrived for that block. After the decoder for each block finishes decoding, the final output message is the concatenation of the individual decoded blocks.

FIG. 11 illustrates exemplary pseudo code for an encoding algorithm 1100 for a random scalable authenticated error correcting LT code. FIG. 12 illustrates exemplary pseudo code for a decoding algorithm 1200 for a random scalable authenticated error correcting LT code.

Efficiency

The design and analysis of the third random scalable construction for authenticated error correcting LT codes is a bit more complicated than the block scalable construction. This is because it must be ensured that enough code symbols are generated so that decoding is successful (this requirement was explicitly supported in the second construction). Specifically, it must be ensured that each block has at least m code symbols, for some $m=\Omega(k)$, where k is the number of input symbols per block. This problem is a generalization of a balls-in-bins problem where it is asked to know how many balls must be thrown into b bins in order to have at least m in each bin. This problem was analyzed in Donald J. Newman and Lawrence Shepp, "The Double Dixie Cup Problem," The American Mathematical Monthly, 67(1):58-61, January 1960. In that work, it is shown that, as b goes to infinity, the expected number of balls to throw is $b[\log b+(m-1)\log \log b+C_m+o(1)]$, for some constant $C_m$. That is, the expected number is $b \log b+b(m-1)\log \log b+O(b)$. Thus, on average, (at least) an additional log log b factor is gained in the time to encode and decode the file. The second construction needed an additional block-corruption tolerance parameter r that indicated how much redudancy to add to each block. That parameter τ is not necessary in this third construction since the construction is rateless and more symbols can be generated as needed.

Do note, however, for a small b (e.g., b=10), that since m must be large (on the order of over 10000), then by the law of large numbers, the average number of balls to throw is O(bm). Note that the asymptotic behavior of this construction as b grows is important since it is desirable that this construction is able to scale up to very large files (e.g., 10 s of gigabytes or more). Suppose the degree distribution requires 12000 code symbols to recover the input with high probability and symbols at least 10 bytes in size are used, then an implicit lower-bound on block size of about 128 KB can be computed. Note that a 1 GB file will contain approximately 8000 such blocks, so both the case where there are many blocks and the case where there are few blocks must be considered.

CONCLUSION

Figure 13:
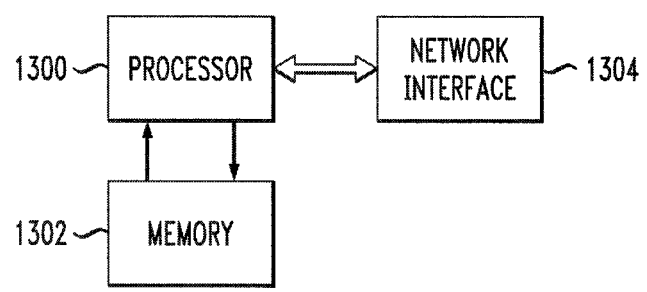
FIG. 13 shows one possible implementation of an exemplary processing device that can implement aspects of the present invention.

FIG. 13 shows one possible implementation of an exemplary processing device that can implement aspects of the present invention. The device in this implementation includes a processor 1300 coupled to a memory 1302 and a network interface 1304. These device elements may be implemented in whole or in part as a conventional microprocessor, digital signal processor, application-specific integrated circuit (ASIC) or other type of circuitry, as well as portions or combinations of such circuitry elements. As will be appreciated by those skilled in the art, the LT code encoding and decoding techniques in accordance with the present invention can be implemented at least in part in the form of one or more software programs that are stored in device memory 1302 and executed by the corresponding processor 1300. The memory 1302 is also used for storing information used to perform computations or other operations associated with the secure alerting protocols of the invention.

Aspects of the present invention are described herein with reference to flowchart illustrations and/or block diagrams of methods, apparatus (systems) and computer program products according to embodiments of the invention. It is to be appreciated that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As further described herein, such computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, as further detailed below, at least one embodiment of the invention includes an article of manufacture tangibly embodying computer readable instructions which, when implemented, cause a computer to carry out techniques described herein. An article of manufacture, a computer program product or a computer readable storage medium, as used herein, is not to be construed as being transitory signals, such as electromagnetic waves.

The computer program instructions may also be loaded onto a computer or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As previously indicated, the above-described embodiments of the invention are presented by way of illustrative example only. Numerous variations and other alternative embodiments may be used, as noted above. Aspects of the present invention permit security against a computationally bounded, adversarial channel.

Additional details regarding certain conventional cryptographic techniques referred to herein may be found in, e.g., A. J. Menezes et al., Handbook of Applied Cryptography, CRC Press, 1997, which is incorporated by reference herein.

The illustrative embodiments of the invention as described herein provide for security against a computationally bounded, adversarial channel. It should again be emphasized that the particular authentication, encryption and/or communication techniques described above are provided by way of illustration, and should not be construed as limiting the present invention to any specific embodiment or group of embodiments. Also, the particular configuration of system elements, and their interactions, may be varied in other embodiments. Moreover, the various simplifying assumptions made above in the course of describing the illustrative embodiments should also be viewed as exemplary rather than as requirements or limitations of the invention.

Numerous alternative embodiments within the scope of the appended claims will be readily apparent to those skilled in the art.

What is claimed is:

1. A method performed by an encoder for generating one or more encoded symbols via an authenticated error correcting code, comprising:
    applying a Luby Transform (LT) code to a plurality of message symbols to produce one or more intermediate symbols using a cryptographic pseudo random number generator (PRNG) to select the plurality of message symbols to combine to produce said one or more intermediate symbols;
    encrypting said one or more intermediate symbols to produce one or more encrypted symbols;
    computing an authentication value over one or more of said one or more encrypted symbols using a secret-key scheme based on a secret key shared by said encoder and a decoder of said one or more encoded symbols; and
    appending said authentication value to said corresponding one or more encrypted symbols to form said one or more encoded symbols.

2. The method of claim 1, wherein said plurality of message symbols are divided into a plurality of blocks, wherein said LT code is applied to each block independently to obtain a corresponding set of one or more intermediate symbols for each of said blocks, wherein said encrypting and computing steps are applied to said corresponding set of one or more intermediate symbols for each of said blocks to collectively form said one or more encoded symbols and wherein said method further comprises the step of permuting said one or more encoded symbols from said plurality of blocks to form one or more permuted encoded symbols.

3. The method of claim 1, wherein said plurality of message symbols are divided into a plurality of blocks, wherein one or more encoded symbols associated with a given block are generated in an order of a final position of said one or more encoded symbols following a permutation, and wherein a desired one of said one or more encoded symbols is generated by (i) independently applying said LT code to said block which said desired one of said one or more encoded symbols is associated with to produce said intermediate symbol associated with said desired one of said one or more encoded symbols; (ii) encrypting said intermediate symbol associated with said desired one of said one or more encoded symbols to produce said encrypted symbol associated with said desired one of said one or more encoded symbols; (iii) computing said authentication value over said encrypted symbol associated with said desired one of said one or more encoded symbols; and (iv) appending said authentication value to said encrypted symbol associated with said desired one of said one or more encoded symbols to form said desired one of said one or more encoded symbols.

4. The method of claim 1, wherein said plurality of message symbols are divided into a plurality of blocks, wherein an LT encoder is associated with each of said blocks, wherein an LT encoder is randomly selected to generate each successive symbol of said one or more encoded symbols, and wherein each of said LT encoders performs said steps of (i) independently applying said LT code to produce said one or more intermediate symbols; (ii) encrypting said at least one intermediate symbol to produce said one or more encrypted symbols; (iii) computing said authentication value over said one or more of said encrypted symbols; and (iv) appending said authentication value to said corresponding encrypted symbols to form said successive symbol of said one or more encoded symbols.

5. The method of claim 1, wherein said cryptographic PRNG generates a sequence of pseudo-random bits based on a seed s.

6. The method of claim 1, wherein said authenticated error correcting code comprises one or more of a secure LT code, a secure Raptor code, a block code and a rateless code.

7. The method of claim 6, wherein said authenticated error correcting code comprises said secure Raptor code, and wherein said method for said secure Raptor code further comprises the step of applying a pre-code to said plurality of message symbols prior to said step of applying an LT code.

8. The method of claim 1, wherein said authentication value comprises one or more of a message authentication code (MAC) and a secret key signature scheme.

9. A method performed by a decoder for processing a plurality of received encoded symbols generated via an authenticated error correcting code, comprising:
   evaluating the integrity of one or more symbols from said plurality of received encoded symbols by verifying an authentication value appended to said one or more symbols from said plurality of received encoded symbols, wherein said appended authentication value is computed by an encoder over one or more encrypted symbols using a secret-key scheme based on a secret key shared by said encoder and a decoder of said one or more encoded symbols;
   if said integrity evaluation succeeds, decrypting said one or more symbols from said plurality of received encoded symbols to produce one or more authenticated decrypted received symbols; and
   decoding said one or more authenticated decrypted received symbols using a Luby Transform (LT) decoder that employs a cryptographic pseudo random number generator (PRNG) to select the one or more authenticated decrypted received symbols that are combined to produce one or more decoded symbols using said secret-key scheme based on said secret key shared by said decoder and said encoder of said received encoded symbols.

10. The method of claim 9, wherein a plurality of message symbols were divided into a plurality of blocks during an encoding stage, and wherein said method further comprises the steps of:
   (a) permuting said plurality of received encoded symbols;
   (b) independently decoding at least a portion of said plurality of received encoded symbols corresponding to a given one of said plurality of blocks by performing said steps of
      (i) evaluating the integrity of one or more symbols from said portion of said plurality of received encoded symbols by verifying an authentication value appended to said one or more symbols from said portion of said plurality of received encoded symbols;
      (ii) if said integrity evaluation succeeds, decrypting said one or more symbols from said portion of said plurality of received encoded symbols to produce said one or more authenticated decrypted received symbols; and
      (iii) decoding said one or more authenticated decrypted received symbols using said LT decoder to produce said one or more decoded symbols; and
   (c) concatenating said one or more decoded symbols from each decoded block of said plurality of blocks to produce a final decoded message.

11. The method of claim 10, wherein said step of permuting said plurality of received encoded symbols further comprises the step of determining which block from said plurality of blocks a given received encoded symbol belongs to and providing said given received encoded symbol to a given LT decoder associated with said determined block, and wherein said given LT decoder associated with said determined block independently operates to update a partial decoding for said determined block.

12. The method of claim 9, wherein a plurality of message symbols were divided into a plurality of blocks during an encoding stage, and wherein said method further comprises the steps of:
   (a) determining a block from said plurality of blocks that a given received encoded symbol from said plurality of received encoded symbols belongs to;
   (b) providing one or more of the received encoded symbols of a given block from said plurality of blocks to an LT decoder associated with said given block, and wherein said LT decoder associated with each given block decodes said given block by performing said steps of:
      (i) evaluating an integrity of one or more symbols from said one or more received encoded symbols of said given block by verifying an authentication value appended to said one or more symbols from said one or more received symbols of said given block;
      (ii) if said integrity evaluation succeeds, decrypting said symbols to produce said one or more authenticated decrypted received symbols; and
      (iii) decoding said one or more authenticated decrypted received symbols using said LT decoder associated with said given block to produce said one or more decoded symbols; and
   (c) concatenating said one or more decoded symbols from each decoded block from said plurality of blocks to produce a final decoded message.

13. The method of claim 9, wherein said authenticated error correcting code comprises one or more of a secure LT code, a secure Raptor code, a block code and a rateless code.

14. A computer program product comprising a tangible non-transitory machine-readable storage medium having encoded therein executable code of one or more software programs, wherein the one or more software programs when executed perform the steps of the method of claim 1.

15. An encoder apparatus for generating one or more encoded symbols via an authenticated error correcting code, comprising:
   a memory; and
   at least one hardware device, coupled to the memory, operative to:
      apply a Luby Transform (LT) code to a plurality of message symbols to produce one or more intermediate symbols using a cryptographic pseudo random number generator (PRNG) to select the plurality of message symbols to combine to produce said one or more intermediate symbols;
      encrypt said one or more intermediate symbols to produce one or more encrypted symbols;
      compute an authentication value over one or more of said one or more encrypted symbols using a secret-key scheme based on a secret key shared by said encoder apparatus and a decoder of said one or more encoded symbols; and
      append said authentication value to said corresponding one or more encrypted symbols to form said one or more encoded symbols.

16. The apparatus of claim 15, wherein said plurality of message symbols are divided into a plurality of blocks, wherein said LT code is applied to each block independently to obtain a corresponding set of one or more intermediate symbols for each of said blocks, wherein said encryption and computation are applied to said corresponding set of one or more intermediate symbols for each of said blocks to collectively form said one or more encoded symbols and wherein said at least one hardware device is further configured to permute said one or more encoded symbols from said plurality of blocks to form one or more permuted encoded symbols.

17. The apparatus of claim 15, wherein said plurality of message symbols are divided into a plurality of blocks, wherein one or more encoded symbols associated with a given block are generated in an order of a final position of said one or more encoded symbols following a permutation, and wherein a desired one of said one or more encoded symbols is generated by (i) independently applying said LT code to said block which said desired one of said one or more encoded symbols is associated with to produce said intermediate symbol associated with said desired one of said one or more encoded symbols; (ii) encrypting said intermediate symbol associated with said desired one of said one or more encoded symbols to produce said encrypted symbol associated with said desired one of said one or more encoded symbols; (iii) computing said authentication value over said encrypted symbol associated with said desired one of said one or more encoded symbols; and (iv) appending said authentication value to said encrypted symbol associated with said desired one of said one or more encoded symbols to form said desired one of said one or more encoded symbols.

18. The apparatus of claim 15, wherein said plurality of message symbols are divided into a plurality of blocks, wherein an LT encoder is associated with each of said blocks, wherein an LT encoder is randomly selected to generate each successive symbol of said one or more encoded symbols, and wherein each of said LT encoders performs said steps of (i) independently applying said LT code to produce said one or more intermediate symbols; (ii) encrypting said at least one intermediate symbol to produce said one or more encrypted symbols; (iii) computing said authentication value over said one or more of said encrypted symbols; and (iv) appending said authentication value to said corresponding encrypted symbols to form said successive symbol of said one or more encoded symbols.

19. The apparatus of claim 15, wherein said cryptographic PRNG generates a sequence of pseudo-random bits based on a seed s.

20. The apparatus of claim 15, wherein said authenticated error correcting code comprises one or more of a secure LT code, a secure Raptor code, a block code and a rateless code.

21. The apparatus of claim 20, wherein said authenticated error correcting code comprises said secure Raptor code, and wherein said at least one hardware device is further configured to apply a pre-code to said plurality of message symbols prior to said application of an LT code for said secure Raptor code.

22. The apparatus of claim 15, wherein said authentication value comprises one or more of a message authentication code (MAC) and a secret key signature scheme.

23. A decoder apparatus for processing a plurality of received encoded symbols generated via an authenticated error correcting code, comprising:
a memory; and
at least one hardware device, coupled to the memory, operative to:

evaluate the integrity of one or more symbols from said plurality of received encoded symbols by verifying an authentication value appended to said one or more symbols from said plurality of received encoded symbols, wherein said appended authentication value is computed by an encoder over one or more encrypted symbols using a secret-key scheme based on a secret key shared by said encoder and a decoder of said one or more encoded symbols;
if said integrity evaluation succeeds, decrypt said one or more symbols from said plurality of received encoded symbols to produce one or more authenticated decrypted received symbols; and
decode said one or more authenticated decrypted received symbols using a Luby Transform (LT) decoder that employs a cryptographic pseudo random number generator (PRNG) to select the one or more authenticated decrypted received symbols that are combined to produce one or more decoded symbols using said secret-key scheme based on said secret key shared by said decoder and said encoder of said received encoded symbols.

24. The apparatus of claim 23, wherein a plurality of message symbols were divided into a plurality of blocks during an encoding stage, and wherein said at least one hardware device is further configured to:
(a) permute said plurality of received encoded symbols;
(b) independently decode at least a portion of said plurality of received encoded symbols corresponding to a given one of said plurality of blocks by performing said steps of
  (i) evaluate the integrity of one or more symbols from said portion of said plurality of received encoded symbols by verifying an authentication value appended to said one or more symbols from said portion of said plurality of received encoded symbols;
  (ii) if said integrity evaluation succeeds, decrypt said one or more symbols from said portion of said plurality of received encoded symbols to produce said one or more authenticated decrypted received symbols; and
  (iii) decode said one or more authenticated decrypted received symbols using said LT decoder to produce said one or more decoded symbols; and
(c) concatenate said one or more decoded symbols from each decoded block of said plurality of blocks to produce a final decoded message.

25. The apparatus of claim 24, wherein said permutation of said plurality of received encoded symbols further comprises determining which block from said plurality of blocks a given received encoded symbol belongs to and providing said given received encoded symbol to a given LT decoder associated with said determined block, and wherein said given LT decoder associated with said determined block independently operates to update a partial decoding for said determined block.

26. The apparatus of claim 23, wherein a plurality of message symbols were divided into a plurality of blocks during an encoding stage, and wherein said at least one hardware device is further configured to:
(a) determine a block from said plurality of blocks that a given received encoded symbol from said plurality of received encoded symbols belongs to;
(b) provide one or more of the received encoded symbols of a given block from said plurality of blocks to an LT decoder associated with said given block, and wherein said LT decoder associated with each given block decodes said given block by performing said steps of:

(i) evaluate an integrity of one or more symbols from said one or more received encoded symbols of said given block by verifying an authentication value appended to said one or more symbols from said one or more received symbols of said given block;

(ii) if said integrity evaluation succeeds, decrypt said symbols to produce said one or more authenticated decrypted received symbols; and (iii) decode said one or more authenticated decrypted received symbols using said LT decoder associated with said given block to produce said one or more decoded symbols; and (c) concatenate said one or more decoded symbols from each decoded block from said plurality of blocks to produce a final decoded message.

27. The apparatus of claim 23, wherein said authenticated error correcting code comprises one or more of a secure LT code, a secure Raptor code, a block code and a rateless code.

* * * * *

UNITED STATES PATENT AND TRADEMARK OFFICE
CERTIFICATE OF CORRECTION

PATENT NO. : 9,496,897 B1
APPLICATION NO. : 14/230655
DATED : November 15, 2016
INVENTOR(S) : Nikolaos Triandopoulos et al.

It is certified that error appears in the above-identified patent and that said Letters Patent is hereby corrected as shown below:

In the Specification

Column 1, Line 37, replace "erasure codes achieve an" with --erasure codes that achieve an--.

Column 6, Line 20, replace "transmitting the result it to the receiver" with --transmitting the result to the receiver--.

Column 6, Line 25, replace "messages symbols" with --message symbols--.

Column 6, Line 37, please add a --.-- before "For simplicity,".

Column 9, Line 39, replace "game the includes" with --game that includes--.

Column 10, Line 24, replace "due to a insufficiently" with --due to an insufficiently--.

Column 14, Lines 37 and 38, replace "error correcting LT codes" with --error correcting LT code--.

Column 16, Line 49, replace "$\gamma$-fraction are corrupted" with --$\gamma$-fraction is corrupted--.

Column 20, Line 44, replace "so both the case" with --so both, the case--.

Column 20, Line 45, replace "many blocks and the case" with --many blocks, and the case--.

Column 20, Line 46, replace "blocks must be considered" with --blocks, must be considered--.

In the Claims

Column 26, Line 32, replace "evaluate the integrity" with --evaluating the integrity--.

Signed and Sealed this
Ninth Day of May, 2017

Michelle K. Lee
*Director of the United States Patent and Trademark Office*

CERTIFICATE OF CORRECTION (continued)
U.S. Pat. No. 9,496,897 B1

Column 26, Line 38, replace "decrypt said" with --decrypting said--.

Column 26, Line 43, replace "decode said one or more" with --decoding said one or more--.

Column 27, Line 3, replace "evaluate an integrity" with --evaluating an integrity--.

Column 27, Line 8, replace "decrypt said" with --decrypting said--.

Column 27, Line 11, replace "decode said one or more" with --decoding said one or more--.